US007000232B2

(12) United States Patent
Jones et al.

(10) Patent No.: US 7,000,232 B2
(45) **Date of Patent: *Feb. 14, 2006**

(54) PROVIDING PREDICTABLE SCHEDULING OF PROGRAMS USING REPEATING PRECOMPUTED SCHEDULES ON DISCRETELY SCHEDULED AND/OR MULTIPROCESSOR OPERATING SYSTEMS

(75) Inventors: Michael B. Jones, Redmond, WA (US); John Regehr, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 82 days.

This patent is subject to a terminal disclaimer.

(21) Appl. No.: 10/847,686

(22) Filed: May 17, 2004

(65) Prior Publication Data

US 2005/0005273 A1 Jan. 6, 2005

Related U.S. Application Data

(63) Continuation-in-part of application No. 09/350,083, filed on Jul. 8, 1999, now Pat. No. 6,745,222, which is a continuation-in-part of application No. 08/781, 106, filed on Jan. 9, 1997, now Pat. No. 6,317,774.

(51) Int. Cl.
*G06F 9/46* (2006.01)

(52) U.S. Cl. ....................... 718/102; 103/107; 103/108

(58) Field of Classification Search ................ 718/100, 718/102, 103, 107, 108

See application file for complete search history.

(56) References Cited

U.S. PATENT DOCUMENTS 5,202,975 A 4/1993 Rasbold et al.
5,210,872 A 5/1993 Ferguson et al.
5,247,675 A 9/1993 Farrell et al.
5,301,333 A 4/1994 Lee
5,317,734 A 5/1994 Gupta
5,392,430 A 2/1995 Chen et al.
5,467,268 A 11/1995 Sisley et al.
5,528,513 A 6/1996 Vaitzblit et al.
5,606,695 A 2/1997 Dworzecki (Continued)

OTHER PUBLICATIONS

Anderson, "Metascheduling for Continuous Media," *ACM Transactions on Computer Systems*, vol. 11, No. 3, pp. 226-252 (Aug. 1993).

(Continued)

*Primary Examiner*—Meng-Al T. An
*Assistant Examiner*—Lilian Vo
(74) *Attorney, Agent, or Firm*—Lee & Hayes, PLLC

(57) ABSTRACT

The present invention provides providing predictable scheduling of programs using repeating precomputed schedules on discretely scheduled and/or multiprocessor operating systems. In one embodiment, a scheduler accesses an activity scheduling graph. The activity scheduling graph is comprised of nodes each representing a recurring execution interval, and has one root, one or more leaves, and at least one path from the root to each leaf. Each node is on at least one path from the root to a leaf, and the number of times the execution interval represented by each node occurs during the traversal of the graph is equal to the number of paths from the root to a leaf that the node is on. Each node has associated with it an execution interval length, and is adapted to being dedicated to executing the threads of a single activity. There may be one scheduling graph for each processor, or a scheduling graph may traverse multiple processors. Start and end times for reservations and constraints are adjusted to compensate for the granularity of the clock of the system. Furthermore, the scheduler may use an existing priority-based scheduler in order to cause scheduling decisions it has made to be acted upon.

15 Claims, 34 Drawing Sheets

U.S. PATENT DOCUMENTS

| | | | |
|---|---|---|---|
| 5,634,113 | A | 5/1997 | Rusterholz |
| 5,640,563 | A | 6/1997 | Carmon |
| 5,742,821 | A | 4/1998 | Prasanna |
| 5,768,592 | A | 6/1998 | Chang |
| 5,768,594 | A | 6/1998 | Blelloch et al. |
| 5,781,531 | A | 7/1998 | Charny |
| 5,812,844 | A | 9/1998 | Jones et al. |
| 5,828,886 | A | 10/1998 | Hayashi |
| 5,978,363 | A | 11/1999 | Dimitrijevic et al. |
| 6,003,061 | A | 12/1999 | Jones et al. |
| 6,041,354 | A | 3/2000 | Biliris et al. |
| 6,049,332 | A | 4/2000 | Boetje et al. |
| 6,085,218 | A | 7/2000 | Carmon |

OTHER PUBLICATIONS

Anderson et al., Support for Continuous Media in the DASH System, *Proceedings of the 10th International Conference on Distributed Computing Systems, Paris, France*, pp. 54-61 (May 1990).

Baccelli et al., "Extremal Scheduling of Parallel Processing with and without Real-Time Constraints," *Journal of the Association for Computing Machinery*, vol. 40. No. 5, pp. 1209-1237 (Nov. 1993).

Bollella et al., "Support For Real-Time Computing Within General Purpose Operating Systems: Supporting Co-Resident Operating Systems," *Proceedings of the IEEE Real-Time Technology and Applications Symposium*, Chicago, IL, pp. 4-14 (May 1995).

Bolosky et al., "Distributed Schedule Management in the Tiger Video Fileserver," *Proceedings of the 16th ACM Symposium on Operating Systems Principles, Saint-Malo, France*, 12 pages (Oct. 1997).

Bolosky et al., "The Tiger Video Fileserver," *Proceedings of the 6th International Workshop on Network and Operating System Support for Digital Audio and Video, IEEE Computer Society, Zushi, Japan*, 9 pages (Apr. 1996).

Clark et al., "Supporting Real-Time Applications in an Integrated Services Packet Network: Architecture and Mechanism," *ACM SIG COMM*, pp. 14-26 (1992).

Compton et al., "Collaborative Load Shedding," *Proceedings of the Workshop on the Role of Real-Time in Multimedia/Interactive Computing Systems, IEEE Computer Society, Raleigh-Durham*, NC, pp. 1-7 (Nov. 1993).

Deng et al., "Dynamic Scheduling of Hard Real-Time Applications in Open System Environment," *Proceedings of the Real-Time Systems Symposium, Washington, D.C.*, 4 pages (Dec. 1996).

Dertouzos et al., "Multiprocessor On-Line Scheduling of Hard-Real-Time Tasks," *IEEE Transactions on Software Engineering*, 15 (12), pp. 1497-1506 (Dec. 1989).

Ford et al., "CPU Inheritance Scheduling", *Proceedings of the Second Symposium on Operating Systems Design and Implementation, Seattle, Washington*, pp. 91-105, USENIX Association (Oct. 1996).

Ford et al., "Evolving Mach 3.0 to a Migrating Thread Model," *Proceedings of the Winter 1994 USENIX Conference, USENIX Association, San Francisco, CA*, pp. 97-114 (Jan. 1994).

Golub, "Operating System Support for Coexistence of Real-Time and Conventional Scheduling," *Technical Report CMU-CS-94-212, Carnegie Mellon University, Pittsburgh*, PA, 13 pages (1994).

Goyal et al., "A Hierachical CPU Scheduler for Multimedia Operating Systems", *Proceedings of the Second Symposium on Operating Systems Design and Implementation, USENIX Association, Seattle, Washington*, pp. 107-121 (Oct. 1996).

Hsueh et al., "An Optimal Pinwheel Scheduler Using the Single-Number Reduction Technique", *Proceedings of the Real-Time Systems Symposium, Washington, DC*, pp. 196-205 (Dec. 1996).

Jones et al., "CPU Reservations and Time Constraints: Efficient, Predictable Scheduling of Independent Activities" *Proceedings of the 16th ACM Symposium on Operating Systems Principles, Saint-Malo, France*, pp. 198-211 (Oct. 1997).

Jones et al., "Modular Real-Time Resource Management in the Rialto Operating System," *Proceedings of the 5th Workshop on Hot Topics in Operating Systems, IEEE Computer Society, Orcas Island, WA*, pp. 12-17 (May 1995).

Jones et al., "An Overview of the Rialto Real-Time Architecture," *Proceedings of the 7th ACM SIGOPS European Workshop, Connemara, Ireland*, pp. 249-256 (Sep. 1996).

Khanna et al., "Realtime Scheduling in SunOS 5.0," *Proceedings of the Winter 1992 USENIX Conference, USENIX Association, San Francisco, CA*, 16 pages (Jan. 1992).

Leslie et al., "The Design and Implementation of an Operating System to Support Distributed Multimedia Applications," *Journal on Selected Areas in Communications*, 13(4), 22 pages (May 1995).

Liu et al., "Scheduling Algorithms for Multiprogramming in a Hard-Real-Time Environment," *Journal of the Association for Computing Machinery* 20(1), pp. 46-61 (1973).

Mercer et al., "Processor Capacity Reserves: Operating System Support for Multimedia Applications," *Proceedings of the IEEE International Conference on Multimedia Computing and Systems*, 10 pages (May 1994).

Nieh et al., "The Design, Implementation and Evaluation of SMART: A Scheduler for Multimedia Applications," *Proceedings of the 16th ACM Symposium on Operating Systems Principles, Saint-Malo, France*, 14 pages (Oct. 1997).

Northcutt, "The Alpha Operating System: Requirements and Rationale," *Archons Project Technical Report #88011, Department of Computer Science, Carnegie-Mellon*, pp. 1-70 (Jan. 1988).

Ramamritham et al., "Efficient Scheduling Algorithms for Real-Time Multiprocessor Systems", *IEEE Transactions on Parallel and Distributed Systems*, 1(2), pp. 184-194 (Apr. 1990).

Schwan et al., "Dynamic Scheduling of Hard-Real-Time Tasks and Real-Time Threads," *IEEE Transactions on Software Engineering* 18(7),pp. 736-748 (Jul. 1992).

Sha et al., "Priority Inheritance Protocols: An Approach to Real-Time Synchronization," *IEEE Transactions on Computers* 39(9), pp. 1175-1185 (Sep. 1990).

Sommer et al., "Operating System Extensions for Dynamic Real-Time Applications," *17th IEEE Real-Time Systems Symposium, Washington, D.C.*, pp. 45-50, (Dec. 1996).

Stankovic et al., "The Spring Kernel: A New Paradigm for Real-Time Systems," *IEEE Software* 8(3), pp. 62-72 (May 1991).

Stoica et al., "A Proportional Share Resouce Allocation Algorithm for Real-Time, Time Shared Systems," *Proceedings of the Real-Time Systems Symposium, Washington, D.C.*, 26 pages (Dec. 1996).

Waldspurger, "Lottery and Stride Scheduling: Flexible Proportional-Share Resource Management," *Massachusetts Institute of Technology*, pp. 1-151 (Sep. 1995).

Wall et al., "Bus Bandwidth Management in a High Resolution Video Workstation," *Third International Workshop on Network and Operating System Support for Digital Audio and Video, IEEE Computer Society, La Jolla, CA*, pp. 274-288 (Nov. 1992).

1 $A_C$ 2450

2499

| time of next iteration | allocated to constraint |
|---|---|
| 125-126 | $C_{C1}$ |
| 165-166 | $C_{C1}$ |
| 205-206 | unallocated |
| 245-246 | unallocated |
| 285-286 | unallocated |
| 325-326 | unallocated |
| 365-366 | unallocated |
| 405-406 | unallocated |

| time of next iteration | allocated to constraint |
|---|---|
| 125-126 | $C_{C1}$ |
| 165-166 | $C_{C1}$ |
| 205-206 | unallocated |
| 245-246 | identified for allocation to $C_{C2}$ |
| 285-286 | identified for allocation to $C_{C2}$ |
| 325-326 | identified for allocation to $C_{C2}$ |
| 365-366 | identified for allocation to $C_{C2}$ |
| 405-406 | unallocated |

| time of next iteration | allocated to constraint |
|---|---|
| 125-126 | $C_{C1}$ |
| 165-166 | $C_{C1}$ |
| 205-206 | identified for allocation to $C_{C3}$ |
| 245-246 | identified for allocation to $C_{C3}$ |
| 285-286 | identified for allocation to $C_{C3}$ |
| 325-326 | identified for allocation to $C_{C3}$ |
| 365-366 | identified for allocation to $C_{C3}$ |
| 405-406 | unallocated |

*Fig. 26*

PROVIDING PREDICTABLE SCHEDULING OF PROGRAMS USING REPEATING PRECOMPUTED SCHEDULES ON DISCRETELY SCHEDULED AND/OR MULTIPROCESSOR OPERATING SYSTEMS

RELATED APPLICATIONS

This application is a continuation of the coassigned and U.S. patent application Ser. No. 09/350,083, filed on Jul. 8, 1999 now U.S. Pat. No. 6,754,222, entitled "Providing Predictable Scheduling of Programs Using Repeating Precomputed Schedules on Discretely Scheduled and/or Multiprocessor Operating Systems," which is, in turn, a continuation-in-part of the coassigned U.S. Pat. No. 6,317,774, issued on Nov. 13, 2001, entitled "Providing Predictable Scheduling of Programs Using Repeating Precomputed Schedules on Discretely Scheduled and/or Multiprocessor Operating Systems,". Priority is hereby claimed to this case under 35 U.S.C. section 120.

TECHNICAL FIELD

The invention relates generally to the field of processor scheduling, and, more specifically, to the field of scheduling the execution of real-time programs and non-real-time programs.

BACKGROUND OF THE INVENTION

Multitasking operating systems allow a number of different programs to execute "simultaneously" on one or more processors. Such multitasking operating systems do so by rapidly switching the processor between the execution of multiple programs.

A multitasking operating system may operate on an underlying platform having either one or multiple processors. A single-processor system is referred to as a uniprocessor system. A system having multiple processors is referred to as a multiprocessor system. Having more processors available generally means that more programs can be executed simultaneously on a single system.

An operating system can also have either discrete or continuous clock or timing facility. A continuous-clock system as used herein refers to the lowest granularity of timing at which an item can be scheduled relative thereto being many orders less than the units of work to be scheduled, such that to the system the timing is effectively continuous—that is, any desired start time, stop time, and/or duration of an activity can be specified with accuracy. Conversely, a discrete-clock system as used herein refers to the lowest granularity of timing at which an item can be scheduled relative thereto being on about the same order as the units of work to be scheduled, such that to the system the timing appears discrete—that is, any desired start time, stop time, and/or duration of an activity cannot be specified with as great as accuracy as in a continuous system. For example, a continuous-clock system may allow for timing to be specified in microsecond increments, while the items to be scheduled may have durations on the order of milliseconds, such that relative to the scheduled items, the clock appears continuous. As a further example, a discrete-clock system may allow for timing to be specified only in millisecond increments (which can be referred to as the discrete clock time-keeping interval)—the same order of timing for which the scheduled items may be specified in, such that relative to the scheduled items, the clock is discrete, which is a barrier for providing accurately scheduled items as desired.

Furthermore, a discrete-clock system may also be either periodic or aperiodic. A periodic-clock system has timing interrupts at regular intervals, for example, at times 0, 1, 2, 3, 4, etc. That is, a periodic clock provides scheduling interrupts on a periodic basis. Conversely, an aperiodic-clock system allows for the skipping of unwanted or undesired intervals. Several potential interrupt intervals may be skipped, such that intervals are instead provided at, for example, 0, 1, 7, 9, 10, 11, 17, 19, etc.

A single program, also known as a "process," may have one or more threads. The word "thread" as used herein means the finest scheduleable unit of execution. A thread is typically represented by a data structure called an execution context, which contains state information about the execution of the thread, such as register and stack contents. When the operating system suspends a thread in favor of the execution of another thread, it copies the information from the registers and stack to the thread's execution context. When the operating system subsequently reselects the thread for execution after suspending another thread, it copies the information in the thread's execution context back to the actual registers and stack. In this way, the thread continues executing with the same register and stack contents as when it was suspended. One or more threads often belong to a process, which corresponds to a body of code and which may own certain single-process resources, such as blocks of memory. While processes and programs can be viewed as roughly equivalent, in some cases, multiple processes may be said to constitute a program, and in other cases, a process may include several programs.

The process of determining which threads to execute at which times is generally termed "scheduling" a computer system's CPU. The way in which scheduling is performed can significantly impact a user's perception of whether individual threads are performing adequately. Modem multimedia applications, for example, often require substantial processor time, and appear to proceed slowly or in a jerky fashion if they do not receive the required processor time.

Real-time programs are programs that have an understanding of their execution performance needs and timeliness requirements, and can interact with a real-time interface of the operating system to make those execution performance needs and timeliness requirements known to the operating system, such as multimedia applications and industrial applications. Real-time programs can each have a number of threads of execution, grouped under one or more "activities," or aspects of the real-time program whose overall execution performance needs differ. Each activity may submit a processor reservation specifying the amount of processor time that its threads collectively need on an ongoing basis. Each thread may itself submit time constraints specifying that it needs a certain amount of processor time by a certain deadline. Reservations and time constraints are known collectively as "execution timing requests."

Certain conventional schedulers handle reservations and time constraints by maintaining the information relating to the reservations and time constraints for use min identifying the next thread to execute on an ad hoc basis each time the processor becomes available for reassignment to a new thread. This conventional "ad hoc" approach to scheduling has several disadvantages. First, completely reevaluating the relative urgencies of all of the existing threads each time the processor becomes available for reassignment often consumes substantial execution time, which makes this execution time unavailable to the real-time programs. Additionally, the approach cannot guarantee at the time a reservation or time constraint is submitted that the reservation or time constraint will be honored. The ad hoc approach can also cause unnecessarily frequent thread switches, thereby reducing the efficiency gains resulting from caching information relating to the executing thread. Further, reservations, while honored for specific periods of time under the ad hoc approach, are not executed with the regularity necessary to honor the reservations over every window of time.

In the copending and coassigned application entitled "Providing Predictable Scheduling of Programs Using A Repeating Precomputed Schedule," filed on Jan. 9, 1997, and assigned Ser. No. 08/781,106, of which the current application is a continuation-in-part, a real-time scheduler is described. However, the real-time scheduler has three primary limitations: first, it operates only a uniprocessor system, not on multiprocessor systems; second, it uses a continuous aperiodic clock, not a discrete clock, and in particular not the more common periodic clock; and, third, it does not utilize the existing scheduler of an operating system such as Windows NT, but rather specifies its own scheduler. For these and other reasons, there is a need for the present invention.

SUMMARY OF THE INVENTION

The present invention provides predictable scheduling of real-time programs and non-real-time programs using a repeating precomputed schedule. In accordance with the invention, a thread scheduling software facility ("the scheduler") overcomes the shortcomings of the conventional ad hoc approach to scheduling by utilizing a precomputed schedule that specifies the future execution of activities and threads having outstanding time constraints, which significantly reduces the processing required to (A) identify the next thread to execute when the processor becomes available and (B) determine the amount of time for which to execute the identified thread. As a result, the process of identifying the next thread to execute and determining the amount of time for which to execute the identified thread can be performed in a bounded amount of time that is independent of the number of threads and activities being scheduled. The precomputed schedule allows the scheduler to assess the feasibility of reservations and time constraints when they are submitted, and immediately refuse any nonfeasible reservations and time constraints. The precomputed schedule also allows the scheduler to guarantee that reservations will be honored with regularity. The precomputed schedule further allows the scheduler to maximize the length of individual intervals assigned to each thread, thereby allowing each thread to make more efficient use of caches. The scheduler further enables blocked activities to receive extra processing time when they are unblocked. The scheduler further effectively schedules the simultaneous execution of real-time and non-real-time programs on the same processor. The scheduler further is able to effectively schedule non-real-time programs in the complete absence of real-time programs, reservations, and constraints.

The precomputed schedule is in one embodiment represented as a directed acyclic graph of nodes, each node corresponding to an execution interval of a specified length, that is incrementally traversed to determine which activity to execute next. (As discussed herein, "executing an activity" means executing one or more threads belonging to the activity.) Each node may either be dedicated to an activity, such that its interval is used to execute that activity, or designated as a "free node," whose interval may be used to execute any activity. A complete traversal of the graph is made by traversing, in turn, each path from a root node to one of a group of leaf nodes. The sum of the lengths of the intervals of the nodes in each such path is equal. The number of paths that pass through each node determine the frequency with which its interval recurs while traversing the graph.

The scheduler incorporates reservations in the scheduling graph by dedicating one or more nodes of the graph to the activity submitting the reservation. Nodes are selected that are on enough paths to be executed frequently enough to satisfy the reservation, and whose intervals are long enough to satisfy the reservation. When the scheduler traverses to a node dedicated to the activity, the scheduler executes one or more threads of that activity. The scheduler incorporates time constraints in the scheduling graph by allocating to the time constraints specific traversals through nodes of the graph that are either dedicated to the activity of the thread submitting the time constraint or that are free nodes. When the scheduler performs the allocated traversals through these nodes, the thread submitting the time constraint is executed.

The scheduler is able to run on any of the following: a uniprocessor continuous-clock system; a multiprocessor continuous-clock system; a uniprocessor discrete-but-aperiodic-clock system; a multiprocessor discrete-but-aperiodic-clock system; a uniprocessor periodic-clock system; and, a multiprocessor periodic-clock system. Furthermore the system may have an existing scheduler than can be used by the scheduler of embodiments of the invention. In the case of multiprocessor systems, there may be one scheduling graph for each processor, or a scheduling graph may traverse multiple processors. In the case of discrete-clock systems, start and end times for reservations and constraints are adjusted to compensate for the granularity of the clock of the system.

BRIEF DESCRIPTION OF THE DRAWINGS

FIG. 24 is a scheduling graph detail diagram showing the constraints to which iterations through a sample scheduling graph node are initially allocated.

FIG. 25 is a scheduling graph detail diagram showing the allocation of specific traversals of a node to a new constraint.

FIG. 26 is a scheduling graph detail diagram showing the reallocation of specific traversals through a node to a newly submitted critical constraint.

DETAILED DESCRIPTION OF THE INVENTION

Figure 1:
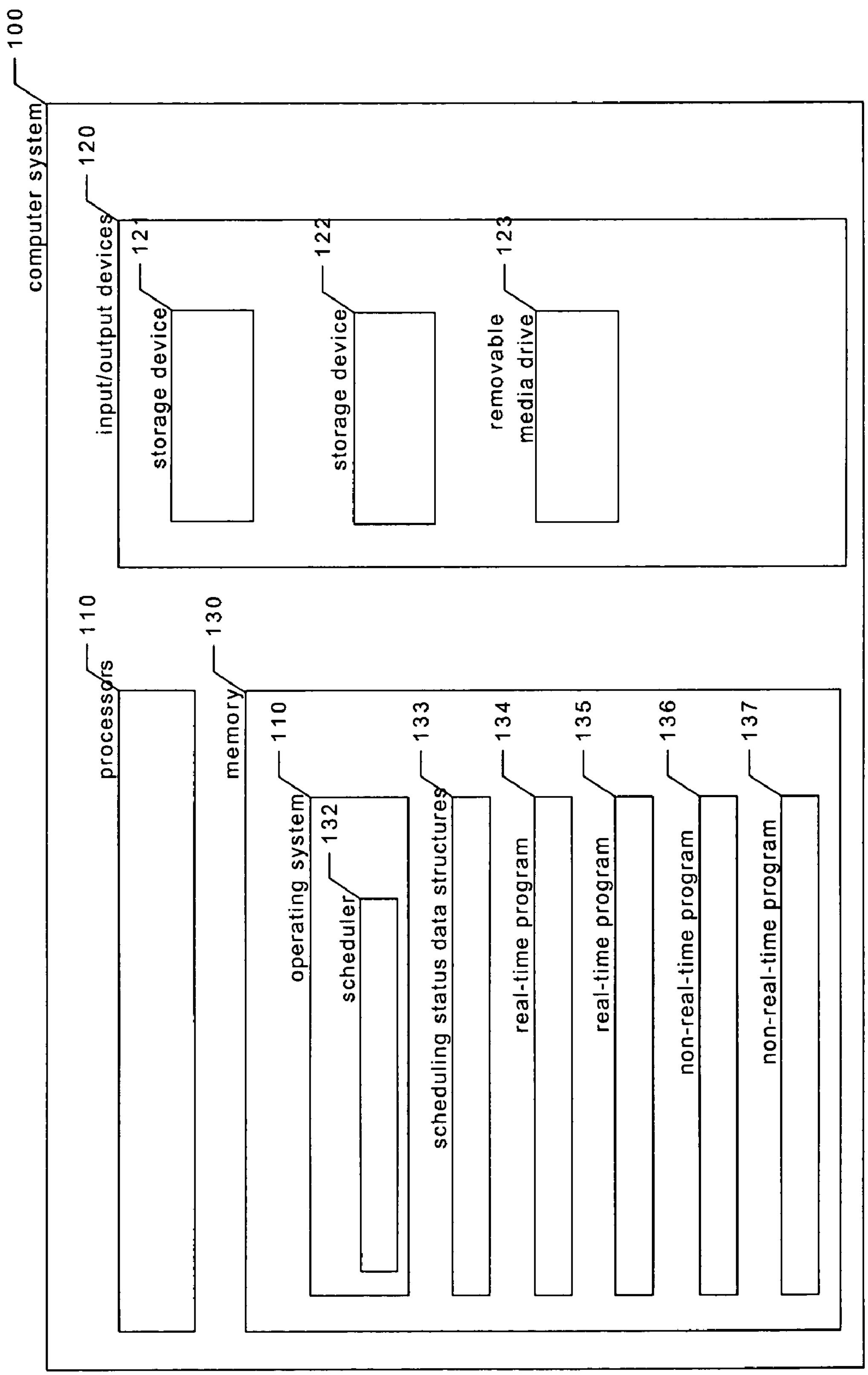
FIG. 1 is a high-level block diagram of the general-purpose computer system upon which the scheduler executes in one embodiment.

The present invention provides predictable scheduling of real-time programs and non-real-time programs using a repeating precomputed schedule. In one embodiment, a thread scheduling software facility ("the scheduler") utilizes a precomputed schedule that specifies the future execution of activities and threads having outstanding time constraints, which significantly reduces the processing required to identify the next thread to execute when the processor becomes available. As a result, the process of identifying the next thread to execute can be performed in a bounded amount of time that is independent of the number of threads and activities being scheduled. The precomputed schedule allows the scheduler to assess the feasibility of reservations and time constraints when they are submitted, and immediately refuse any nonfeasible reservations and time constraints. The precomputed schedule also allows the scheduler to guarantee that reservations will be honored with regularity. The precomputed schedule further allows the scheduler to maximize the length of individual intervals assigned to each thread, thereby allowing each thread to make more efficient use of caches. The scheduler further enables blocked activities to receive extra processing time when they are unblocked. The scheduler also supports embedded constraints, and the inheritance of constraints from threads blocked on a synchronization mechanism to the thread owning the synchronization mechanism. The scheduler further effectively schedules the simultaneous execution of real-time and non-real-time programs on the same processor. The scheduler further is able to effectively schedule non-real-time programs in the complete absence of real-time programs, reservations, and constraints.

The precomputed schedule is in one embodiment represented as a directed acyclic graph of nodes, each node corresponding to an execution interval of a specified length, that is incrementally traversed to determine which activity to execute next. That is, when the processor becomes available for reassignment to a new thread, the graph is traversed from the current node to the next node, and the processor is assigned in accordance with the contents of the next node. Each node may either be dedicated to an activity, such that its interval is used to execute that activity, or designated as a "free node," whose interval may be used to execute any activity. A complete traversal of the graph is made by traversing, in turn, each path from a root node to one of a group of leaf nodes. The sum of the lengths of the intervals of the nodes in each such path is equal. The number of paths that pass through each node determine the frequency with which its interval recurs while traversing the graph.

A processor reservation ("reservation") is submitted by an activity, and specifies an amount of execution time and an interval called a "reservation window" ("window"). The reservation is a request to execute the activity's threads for a total amount of time at least as large as the specified amount of time during every time period that has the length of the specified reservation window. For example, a reservation specifying an amount of 30 time units and a window of 100 time units will be satisfied only if the threads of the submitting activity are executed for at least 30 time units during every period of time that is 100 time units long. In order to process a new reservation, the scheduler identifies one or more free nodes whose intervals are long enough and recurs frequently enough to satisfy the reservation, and assigns it to the activity submitting the reservation. If no such free node exists in the present graph, the scheduler attempts to rebuild the graph to accommodate the new reservations and previously accepted reservations. If it is impossible to so rebuild the graph, the scheduler refuses the new reservation.

A time constraint ("constraint") is submitted by a thread when it needs to perform a certain amount of execution during a particular period of time. Each time constraint specifies an estimate of the amount of processor time required to execute the constraint, a starting time identifying the time of which execution of the constraint can commence, and a deadline identifying the time by which execution of the constraint must be finished. For example, a constraint might specify that a thread be executed for 200 time units between a starting time of 1700 and an ending time of 2500. In order to process a new constraint, the scheduler allocates to the constraint specific future traversals through (a) nodes dedicated to the activity of the thread submitting the constraint and (b) free nodes at times within the range of time specified in the constraint totaling the execution time estimate of the constraint. If this is not possible, the scheduler refuses the constraint, but still uses the constraint to favor the thread submitting the constraint over other threads of the same activity until the constraint is completed. The scheduler tracks the amount of execution time committed to the constraint by deducting from the execution time estimate of the constraint the length of each period of time for which the constraint is executed. If the execution time estimate is exhausted before the submitting thread ends the constraint, the constraint ceases to receive allocated iterations through nodes, but retains a medium scheduling priority higher than the scheduling priority of activities having no constraints or reservations. If, on the other hand, the thread submitting a constraint ends the constraint while the constraint still has a positive execution time estimate, the scheduler converts this "thread constraint" to an "activity constraint," allowing any thread of that activity to which the submitting thread belongs to use iterations through nodes allocated to the constraint.

The scheduler schedules the execution of threads by traversing the graph. When a new node is entered during the scheduler's traversal, if the interval represented by the current traversal through the node is allocated to a constraint, the scheduler executes the thread of the accepted constraint that has the earliest deadline. If the interval represented by the current traversal through the node is not allocated to a constraint, but the node is dedicated to an activity, the scheduler selects a thread of that activity to execute. If the node is free or no threads in the activity to which the node is dedicated are presently executable, the scheduler executes a thread of an activity that recently blocked while executing. If no such activities exist, the scheduler selects a thread from the activity that least recently received any free time. When selecting a thread from an activity, the scheduler first selects from threads having failed constraints. If the activity has no such threads, the scheduler selects the thread of the activity that least recently received any free time.

FIG. 1 is a high-level block diagram of the general-purpose computer system upon which the scheduler in one embodiment executes. The computer system 100 contains a plurality of processors 110, input/output devices 120, and a computer memory (memory) 130. Among the input/output devices is a storage device 121, such as a hard disk drive, and a network connection 122, through which the computer system 100 may communicate with other connected computer systems (not shown). The input/output devices also include a removable media drive 123, which can be used to install software products, including the scheduler, which are provided on a computer-readable medium, such as a CD-ROM. The memory 130 desirably contains an operating system 131, which desirably executes on the plurality of processors 110 and includes the soft scheduling facility (the scheduler) 132. The memory 130 further contains scheduling status data structures 133 used by the scheduler 132, and real-time programs such as real-time programs 134 and 135 and non-real-time programs 136 and 137 whose threads are executed by the computer system under the control of the scheduler. While the scheduler is desirably implemented on a computer system configured as described above, those skilled in the art will recognize that it may also be implemented on computer systems having different configurations. For example, the scheduler may be implemented using a "set-top box," or specialized computer-based hardware device for interfacing televisions with information sources such as the Internet and dedicated entertainment servers. The scheduler may also be implemented on multimedia servers providing information to requesting computers.

In one embodiment, the computer system on which the scheduler operates has one of the following aspects: it is a multiprocessor, continuous-clock system; it is a uniprocessor, discrete-but-aperiodic-clock system; it is a multiprocessor, discrete-but-aperiodic-clock system; it is a uniprocessor periodic-clock system; or, it is a multiprocessor, periodic-clock system. Furthermore, in one embodiment, the scheduler utilizes an existing scheduler that may be part of the operating system of the computer system. With respect to operating systems such as the Windows NT operating system, the operating system may have an existing priority-based scheduler. Therefore, the scheduler of an embodiment of the invention utilizes the existing scheduler, as is described below, so as to allow applications to utilize the existing scheduler to obtain approximately the same behaviors as they did prior to the addition of the scheduler of an embodiment of the invention.

Uniprocessor Continuous-Clock Example

In order to more fully convey the details of the scheduler, the scheduler is discussed herein in conjunction with a specific example. Those skilled in the art will recognize that, because it was selected to facilitate this discussion, aspects of the example may differ from actual scheduling scenarios. The example is described for a uniprocessor, continuous-clock system. The differences that are necessary to implement the example on a multiprocessor and/or discrete-clock system are then provided.

Table 1 shows a list of reservations submitted by activities in accordance with the example.

TABLE 1

| Activity | Amount Reserved | Reservation Window | Fraction of Total Execution Time |
|---|---|---|---|
| $A_A$ | 2 | 20 | 10% |
| $A_B$ | 2 | 10 | 20% |
| $A_C$ | 1 | 40 | 2.5% |
| $A_D$ | 5 | 40 | 12.5% |
| $A_E$ | 6 | 30 | 20% |
| $A_F$ | 3 | 40 | 7.5% |
| $A_G$ | 1 | 20 | 5% |
| $A_H$ | 1 | 40 | 2.5% |
| | | | 80% |

Each row of the table corresponds to the reservation for a different activity, and shows, in arbitrary time units, the amount of execution time reserved for the activity and the length of the recurring reservation window in which the activity must receive the amount reserved on an ongoing basis. Each row further shows a fraction of the total available execution time that will be consumed by satisfying the reservation. For example, the second line of the table shows that, in accordance with the reservation for activity $A_B$, threads of activity $A_B$ must be executed for at least 2 time units during every period of time 10 time units long, thereby consuming 20% of the total available execution time.

Figure 2:
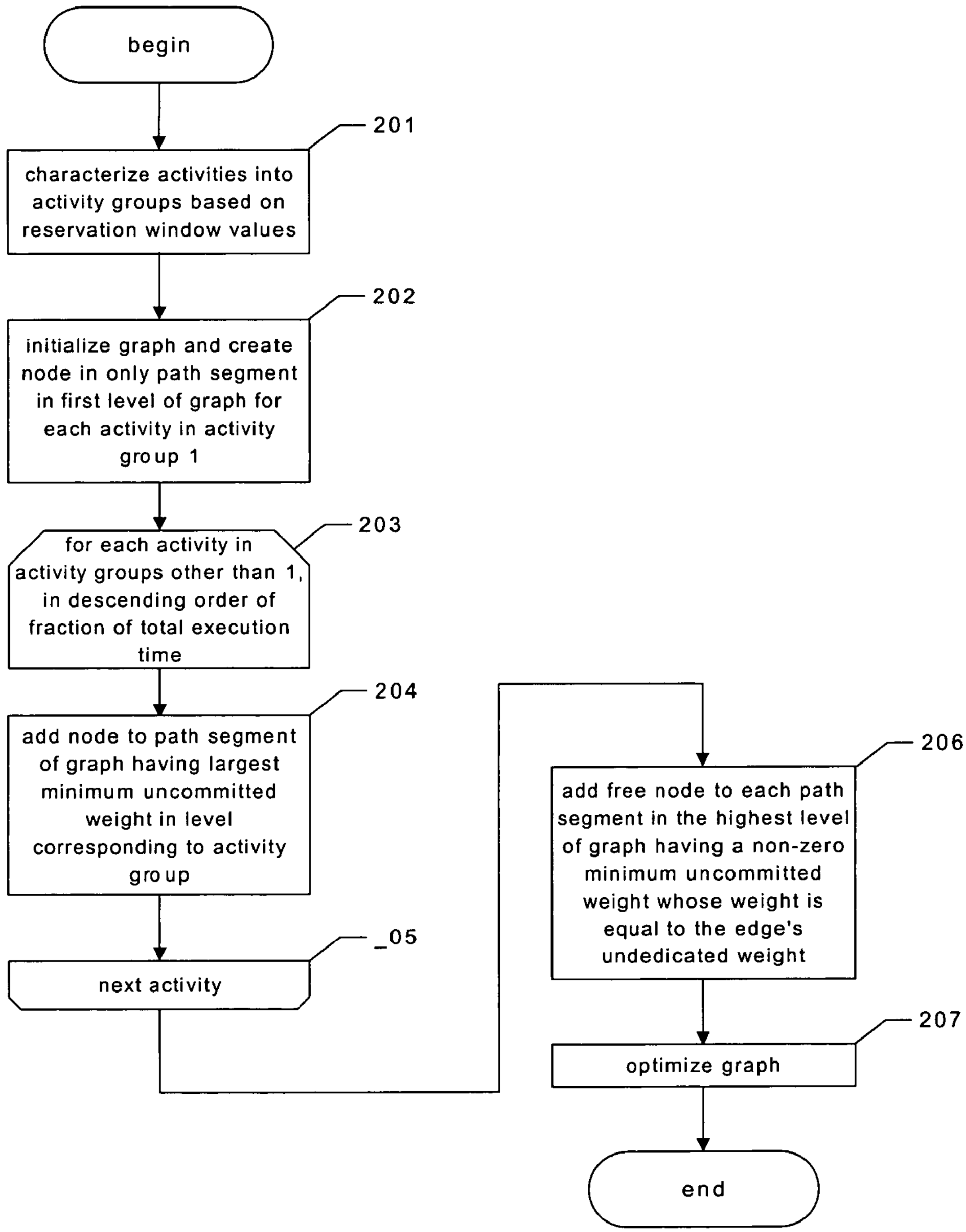
FIG. 2 is a flow diagram showing the method performed by the scheduler to construct a scheduling graph in one embodiment.

In order to design an execution schedule that will accommodate the set of reservations shown in Table 1, the scheduler constructs a scheduling graph. As is discussed in greater detail below, the scheduler desirably constructs a scheduling graph when the scheduler is started, as well as when reconstruction is required to accommodate a new reservation. FIG. 2 is a flow diagram showing the method desirably performed by the scheduler to construct a scheduling graph. In 201, the scheduler characterizes the activities by the relative length of their reservation windows, as shown below in Table 2.

TABLE 2

| Activity Group | Reservation Window Range | Activities |
|---|---|---|
| 1 | 10–19 | $A_B$ |
| 2 | 20–39 | $A_A$, $A_E$, $A_G$ |
| 1 | 40–79 | $A_C$, $A_D$, $A_F$, $A_H$ |

Table 2shows that a first reservation window range extends from the smallest reservation window length (10 for activity $A_B$) to just less than $2^1$ times the smallest reservation window length (19), a second range extends from $2^1$ times the smallest reservation window length (20) to just less than $2^2$ times the smallest reservation window length (39), and a third range extends from $2^2$ times the smallest reservation window length (40) to just less than $2^3$ times the smallest reservation window length (79). The constructed scheduling graph will have a number of different paths from its root to its leaves, each having the same total weight, which is equal to the smallest reservation window length. The scheduling graph contains branches, which delineate both levels of the graph and segments of the root-to-leaf paths.

Those activities occurring in the first group will be located on the only path segment at the fist level of the scheduling graph, and will be on every path from the root of the scheduling graph to a leaf. Activities in the second activity group will be located on one of the two path segments in the second level of the scheduling graph and will be on one-half of the paths from the root of the scheduling graph to a leaf. Finally, the activities in the third activity group will be located on one of the four path segments at the third level of the scheduling graph, and will be on one-fourth of the paths from the root of the scheduling graph to a leaf.

Figure 3:
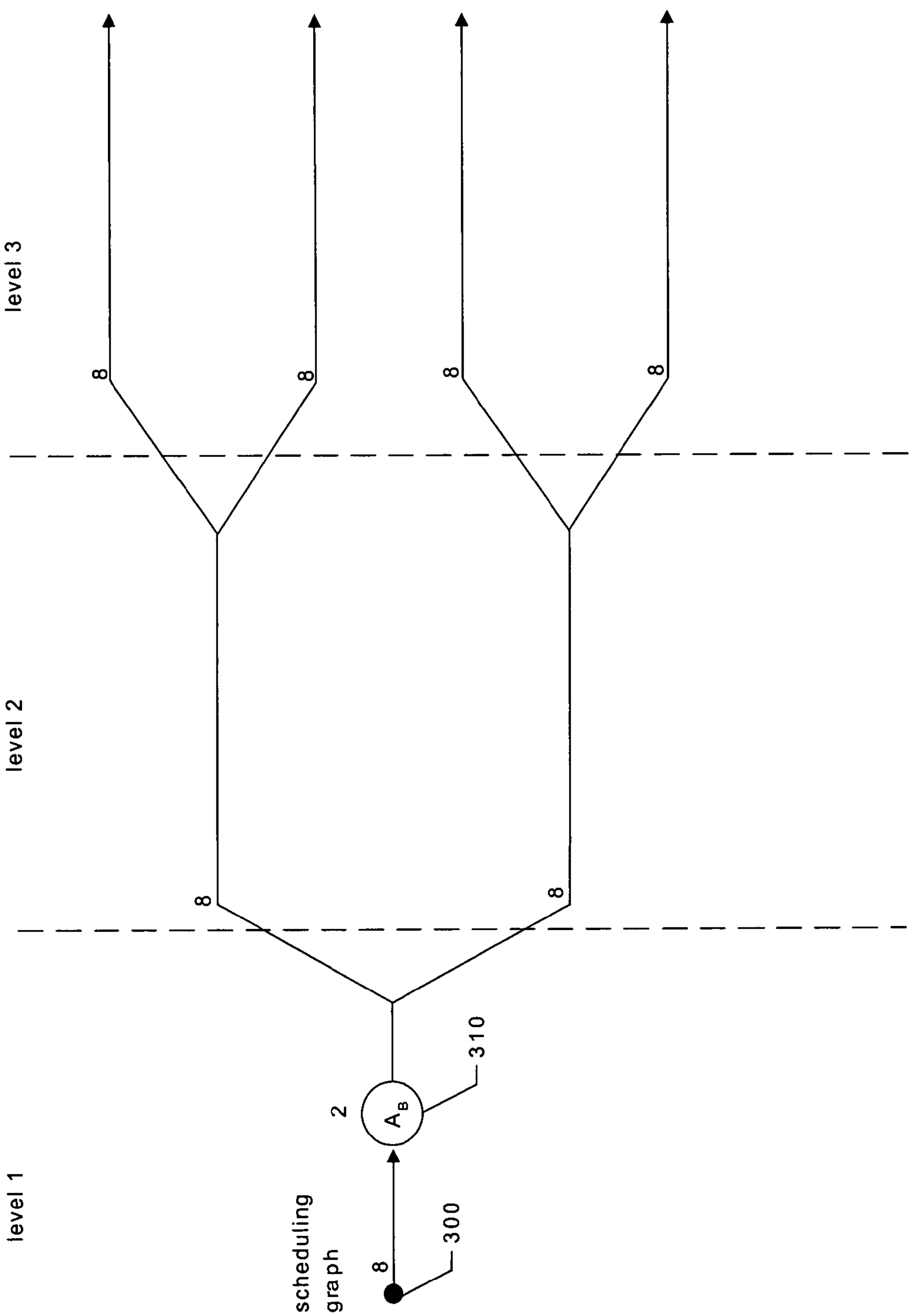
FIGS. 3, 4, 5, 6, 7, 8, 9, 10, 11, and 12 are scheduling graph diagrams showing the construction of a sample scheduling graph.

Returning to FIG. 2, in 202, the scheduler initializes the scheduling graph and, for each activity in activity group 1, creates a node in the only path segment in the first level of the scheduling graph. FIG. 3 is a scheduling graph diagram showing the construction of the first level of a scheduling graph designed to accommodate the set of reservations shown in Table 1. FIG. 3 shows a scheduling graph having a root 300. The graph has a single path segment in level 1, which branches into two path segments in level 2, which in turn branches into four path segments in level 3. To construct the first level of the scheduling graph, the scheduler inserts a node for each activity in the first activity group as a chain of successive descendants of the root. In the case of the example, the scheduler creates one node 210 for activity $A_B$, the only activity in the first group. Each node receives a weight equal to the reservation amount of the reservation for the activity, multiplied by the ratio of the floor of the reservation window range for the activity's activity group to the requested reservation window for the activity. Because the reservation for activity $A_B$ specifies a reservation amount of 2 time units, the floor of activity group B is 10 time units, and the requested reservation window for activity $A_B$ is 10 time units, node 310 has weight 2 (2×10/10). The scheduler also returns to the activity an indication of the actual reservation amount (the node weight) and reservation window (the floor of the reservation window range for the activity's activity group) accorded to the activity (not shown). If this actual reservation is unacceptable to the activity, the activity may withdraw this reservation and submit a revised one. After adding the nodes from activity group 1 to level 1 of the graph, the scheduler calculates, for each path segment, the smallest uncommitted weight of any of the root-to-leaf paths that the path segment is part of. It can be seen from FIG. 3 that, because node 310 having weight 2 is on each of the four root-to-node paths, each of these paths has uncommitted weight of 8. Every path segment therefore has a minimum uncommitted weight of 8 time units.

Returning to FIG. 2, in 203–205, the scheduler loops through the activities in the activity groups besides activity group 1 in descending order of fraction of total execution time. In 204, the scheduler adds a node to the graph for the current activity having a weight equal to the reservation amount of the reservation for the activity, multiplied by the ratio of the floor of the reservation window range for the activity's activity group to the actual reservation window for the activity. The scheduler adds the node in the level of the graph corresponding to the current activity's activity group to the path segment in that level having the largest minimum uncommitted weight. If that largest minimum uncommitted weight is smaller than the weight required for the node of the current activity, the scheduler assigns all of the minimum uncommitted weight of the path segment having the largest minimum uncommitted weight to a node for the activity, and proceeds to add additional nodes to one or more additional path segments in that level for the balance of the weight required for the current activity. In cases in which the weight of these additional nodes would be smaller than a minimum weight corresponding to the amount of time required to perform 50–100 context switches, the node created in the path segment having the largest minimum uncommitted weight is assigned less than the entire largest minimum uncommitted weight so that the additional node may exceed the minimum node weight. Also, when adding a node to a path segment and the weight of the node is smaller than the minimum uncommitted weight of the path segment, the facility ensures that the minimum uncommitted weight of the path segment after adding the node will not be less than the minimum nodal weight. If the remaining uncommitted weight of the path segment would be less than the minimum node weight, then the scheduler reduces the weight of the node added to that path segment for the activity and adds an additional node to another path segment for the activity. Alternatively, the facility assigns to the node the entire minimum nodal weight of the path segment, so that the total weight of the node exceeds the reservation amount for the activity by up to the amount of time required to perform a few context switches. In 205, the scheduler loops back to 203 to process the next activity.

Figure 4:
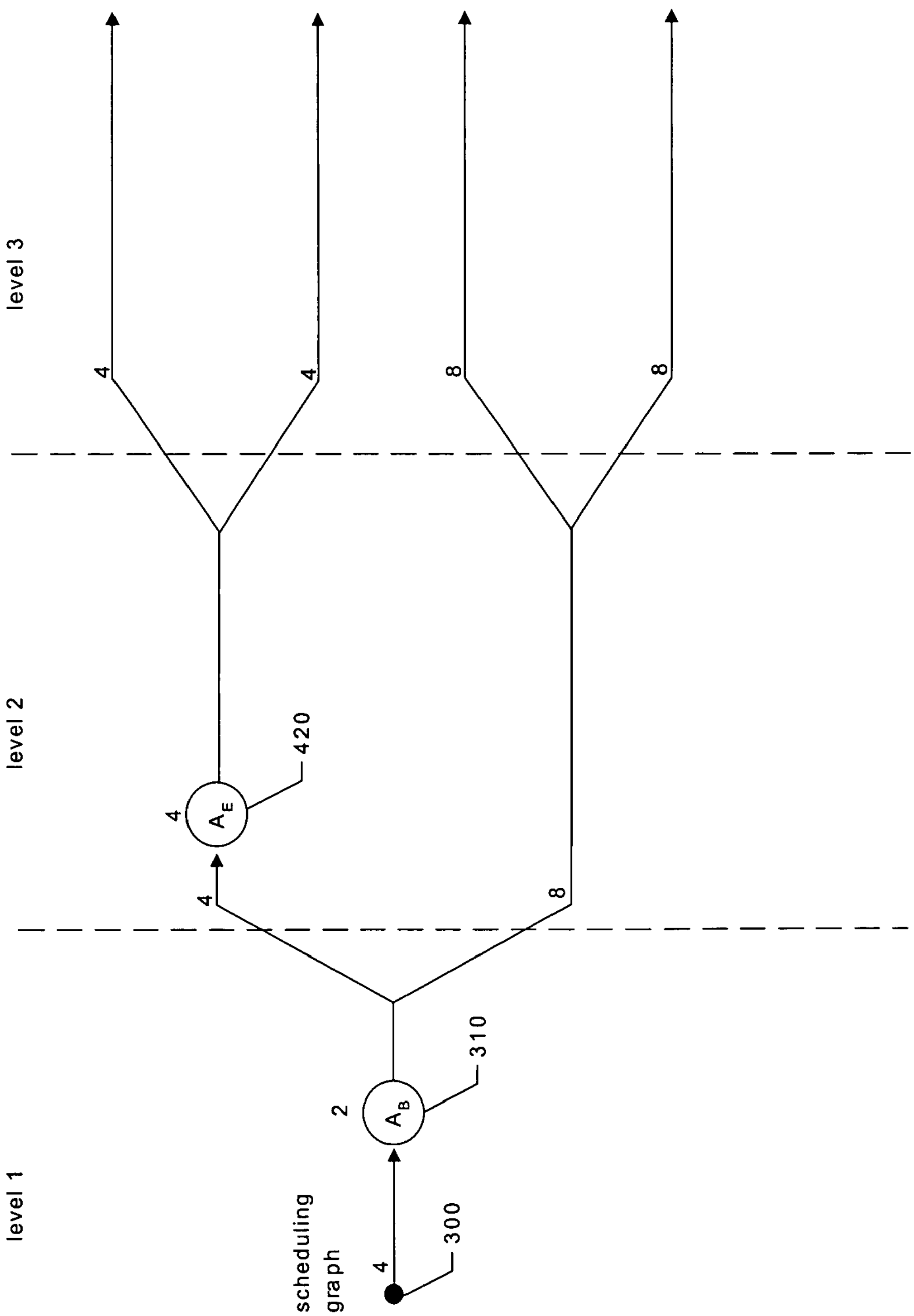

FIGS. 4–12 are scheduling graph diagrams showing the construction of the sample scheduling graph in accordance with 203–205. FIG. 4 shows that the scheduler first-processes activity $A_E$, which has the largest remaining fraction of total execution time (20%). Level 2 of the scheduling graph has two path segments, each having minimum uncommitted weights of 8. The scheduler adds node 420 to the upper path segment for activity $A_E$, giving it a weight of 6×20/30, or 4. After adding the node, the scheduler adjusts the largest minimum uncommitted weight of all of the affected path segments: because new node 420 is on both of the top two root-to-leaf paths, the scheduler reduces the minimum uncommitted weight for each of the four path segments on these two root-to-leaf paths from 8 to 4. It should be noted that scheduling a reservation for activity $A_E$ as discussed above, the actual reservation amount is 4 rather than 6 and the actual reservation window is 20 rather than 30. While using this scheduling graph will result in activity $A_E$ being executed for 4 of every 20 time units, activity $A_E$ will not necessarily always be executed for 6 of every 30 time units as requested. In this sense, the scheduler does not honor the request for reservation with regularity. The scheduler does, however, return an indication to activity $A_E$ of the actual reservation amount and actual reservation window, allowing activity $A_E$ to modify its reservation if receiving 4 out of every 20 time units is unacceptable to the activity.

Figure 5:
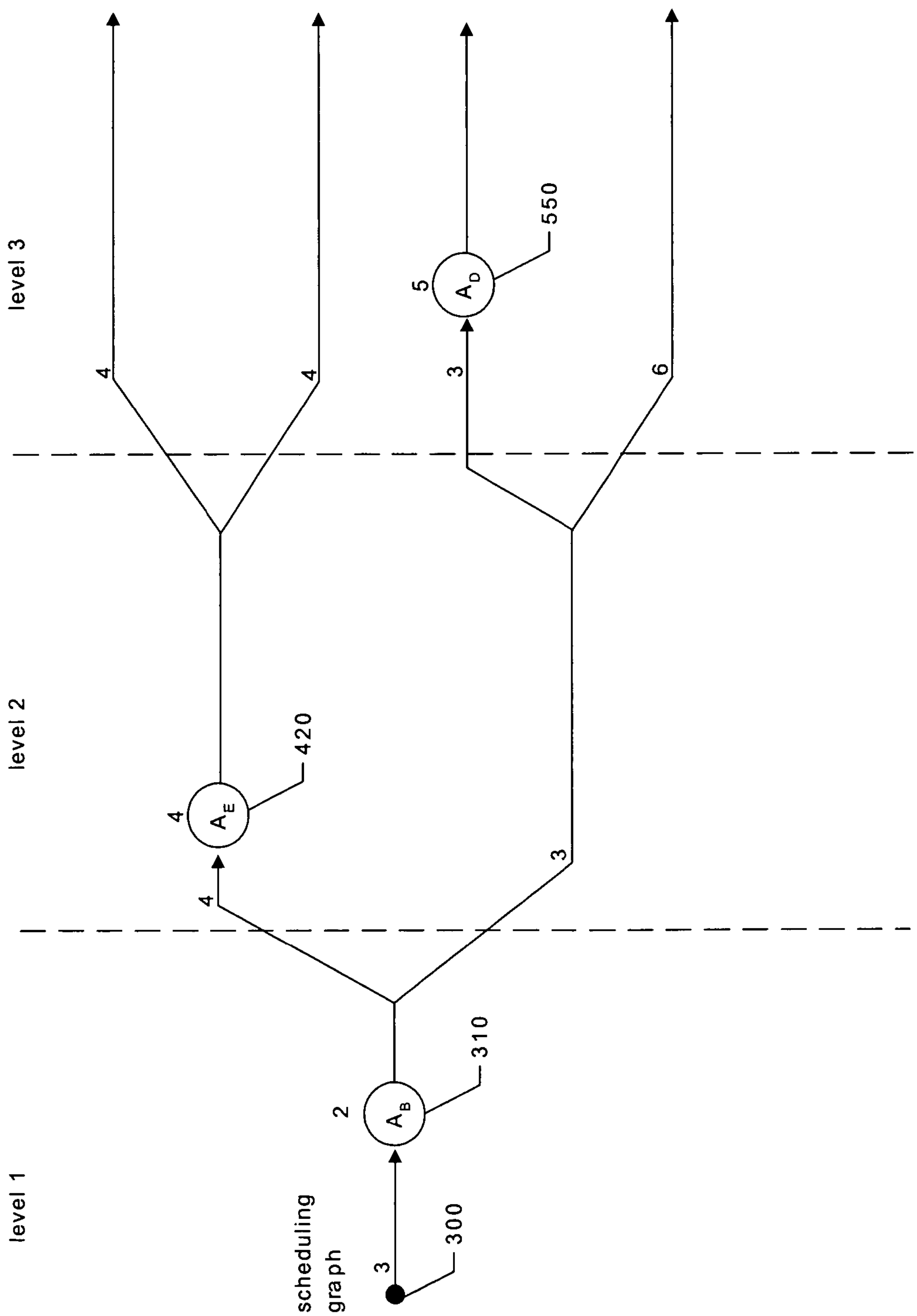

FIG. 5 shows the scheduler adding a node for activity $A_D$ to the scheduling graph. Because activity $A_D$ has the next-largest fraction of total processing time (12.5%), the scheduler creates a node for its reservation next. The scheduler adds node 550 to the third path segments of level 3, because it has the largest minimum uncommitted weight (6 vs. 4). Node 550 has a weight of 5 (5×40/40). Because new node 550 is on the third root-to-node path, the scheduler reduces the minimum uncommitted weight of the one level 1, one level 2, and one level 3 path segments on the third root-to-leaf path from 8 to 3.

Figure 6:
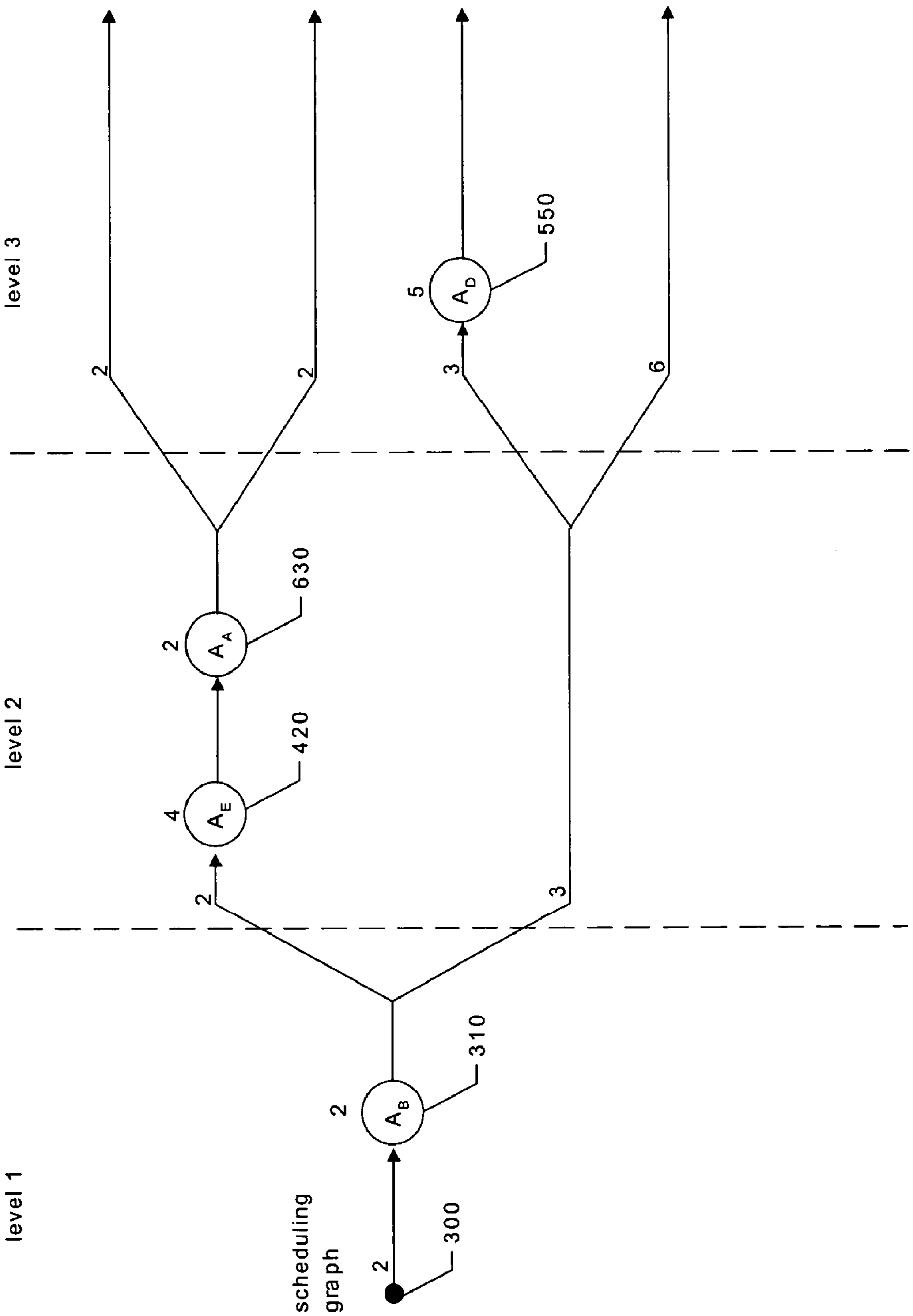

FIG. 6 shows the scheduler adding the final reservation node to level 2 for activity $A_A$. The scheduler creates the node 630 having weight 2 for activity $A_A$ in the upper path segment of level 2, as this path segment has the largest minimum uncommitted weight among the path segments of level 2 (4 vs. 3). The scheduler reduces the minimum uncommitted weights of the one level 1, one level 2, and two level 3 path segments on the upper two root-to-leaf paths from 4 to 2.

Figure 7:
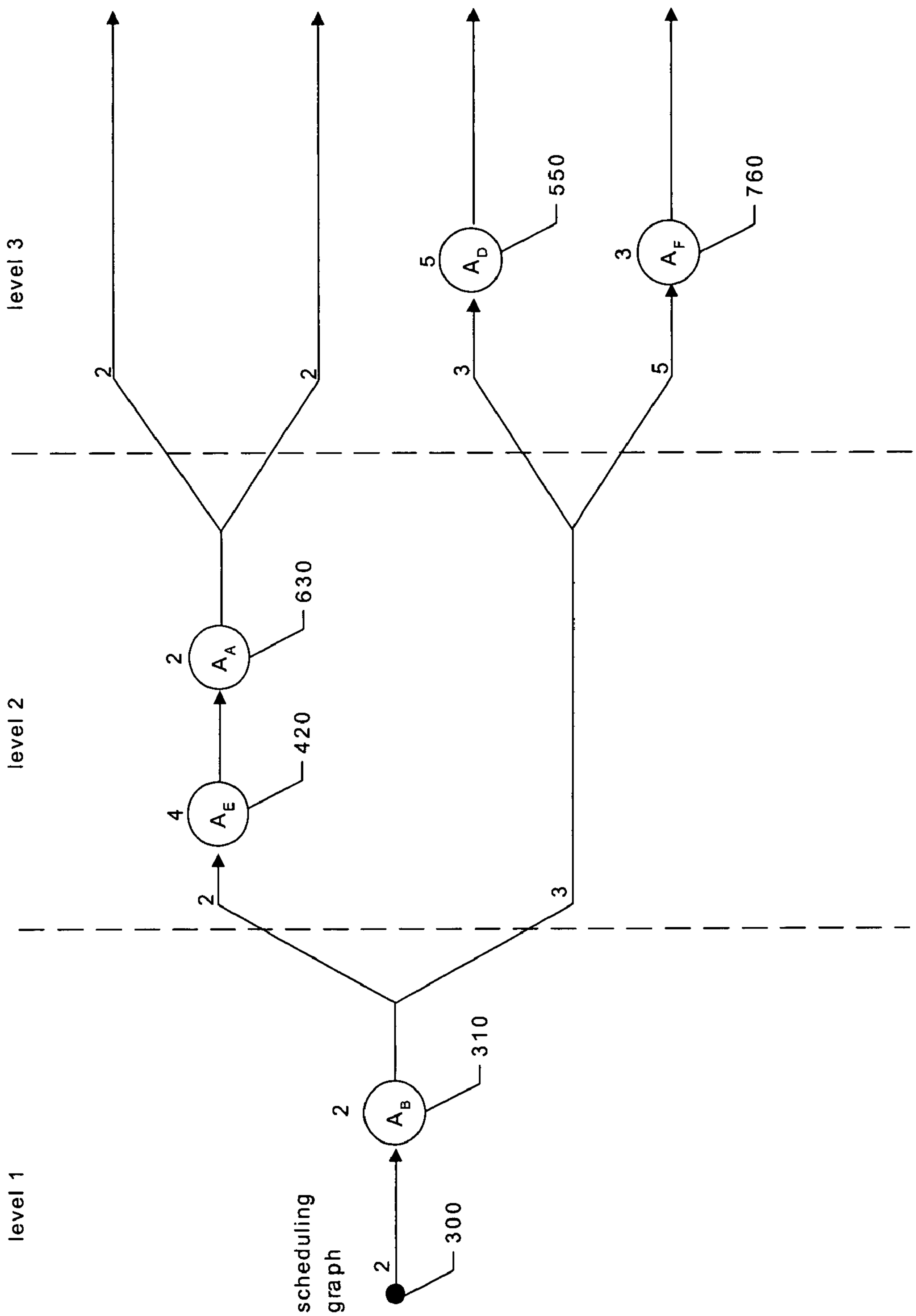
Figure 8:
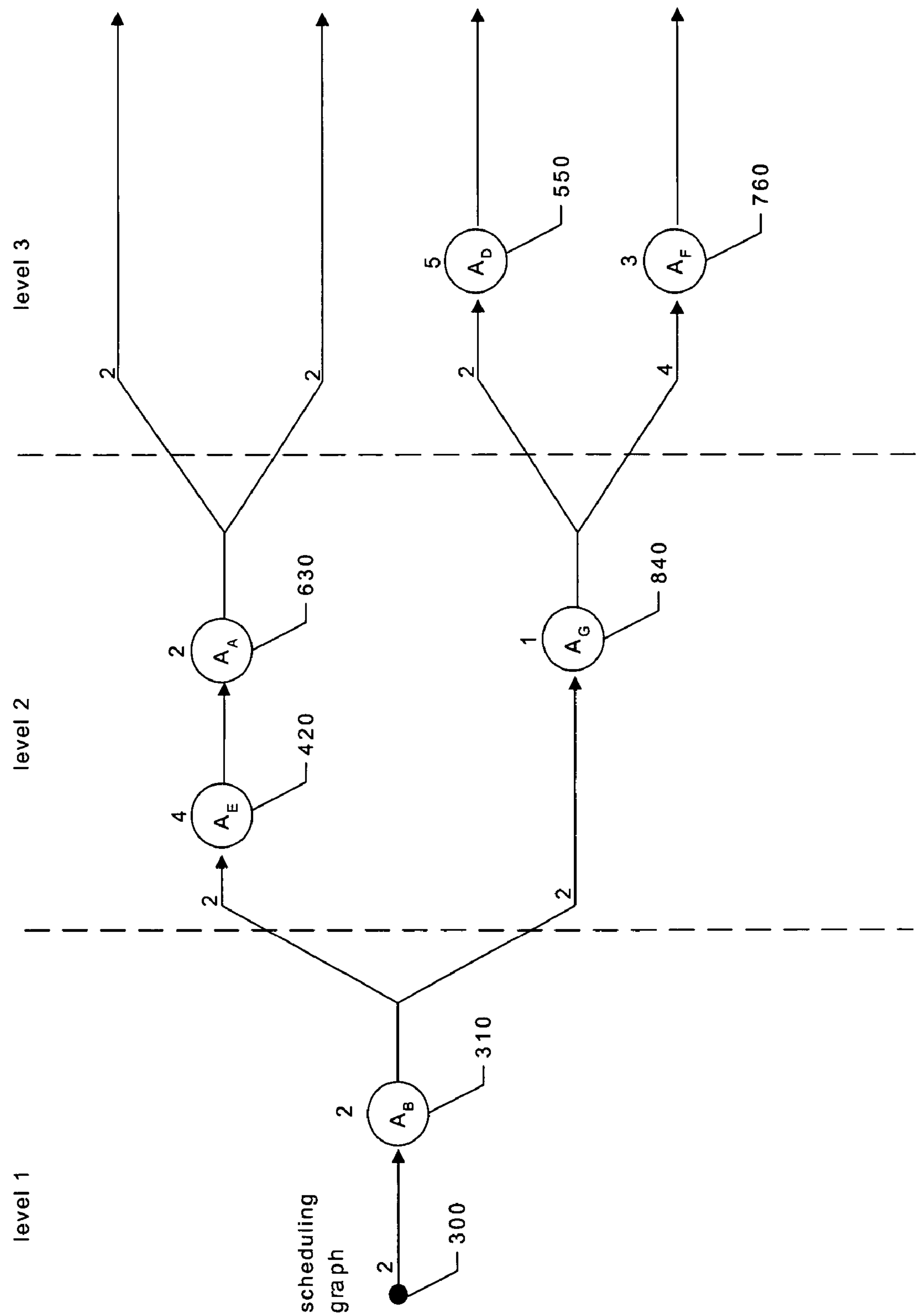
Figure 9:
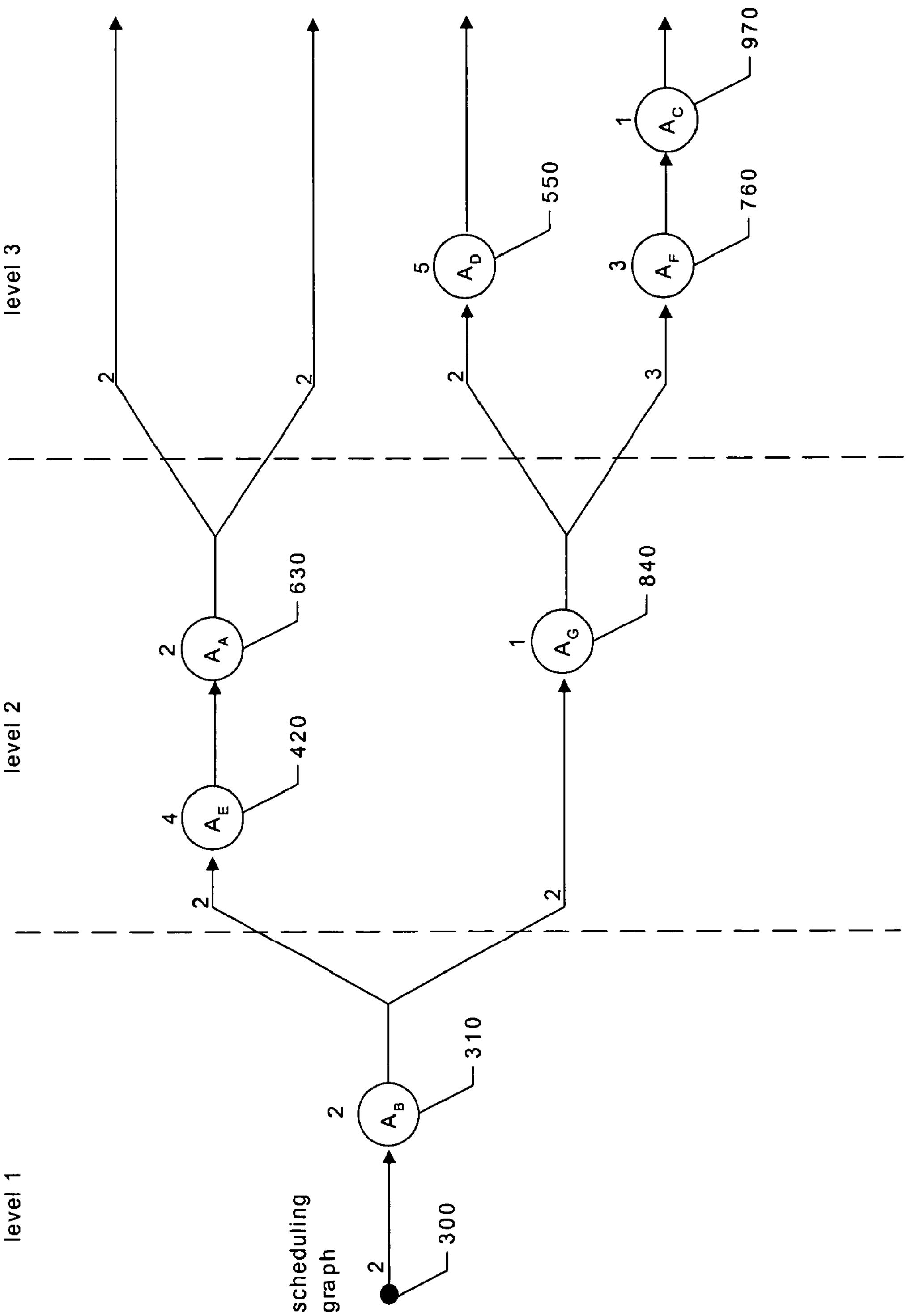
Figure 10:
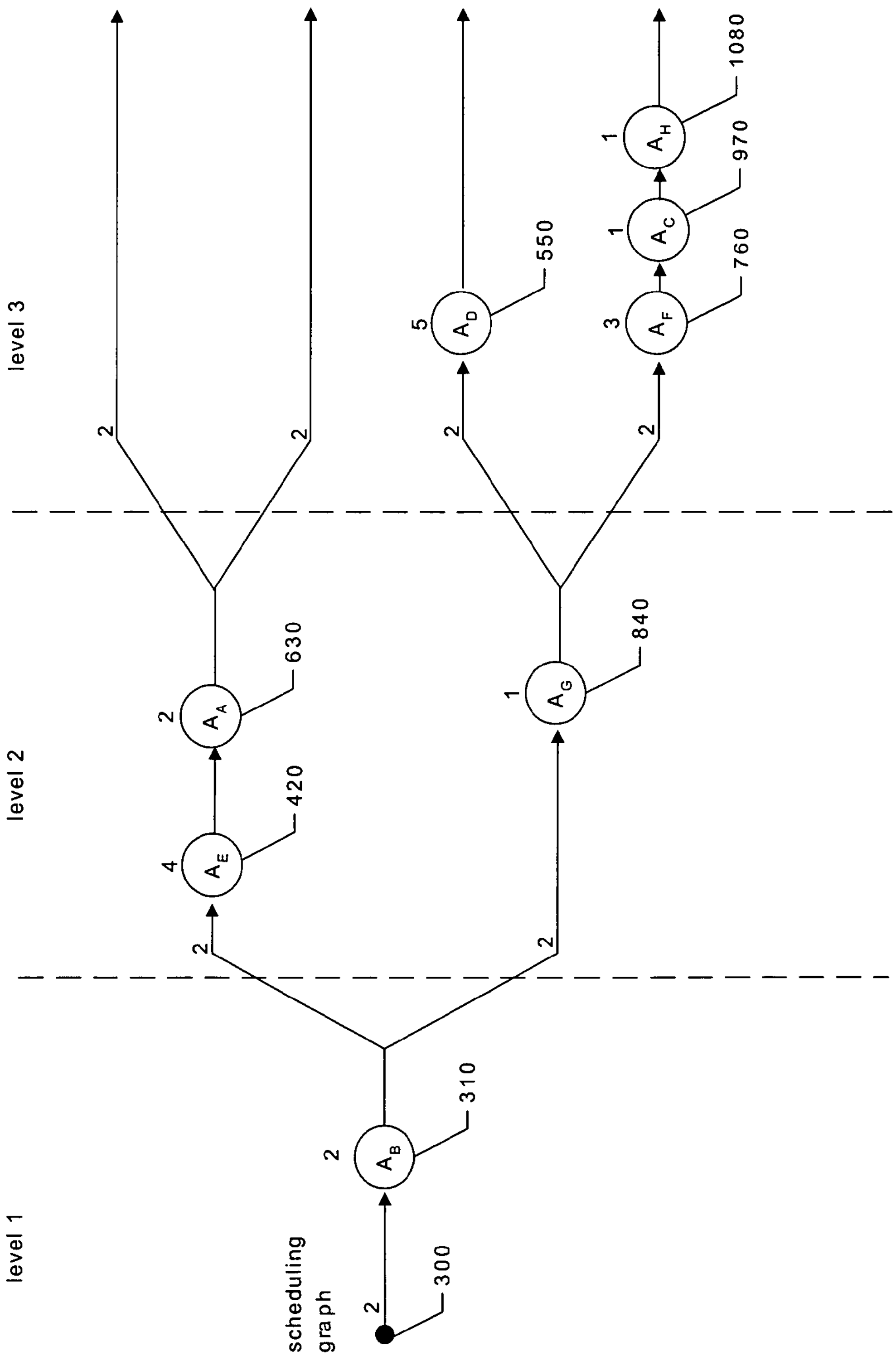

FIGS. 7, 8, 9, and 10 show the scheduler adding nodes to level 3 for activities in the third activity group. FIG. 7 shows the scheduler adding node 760 to activity $A_F$. FIG. 8 shows the scheduler adding node 840 for activity $A_G$. FIG. 9 shows the scheduler adding node 970 for activity $A_C$. FIG. 10 shows the activity adding node 1080 for activity $A_H$. In each case, the scheduler adds the node for the activity to the path segment of the appropriate level having the largest minimum uncommitted weight.

Figure 11:
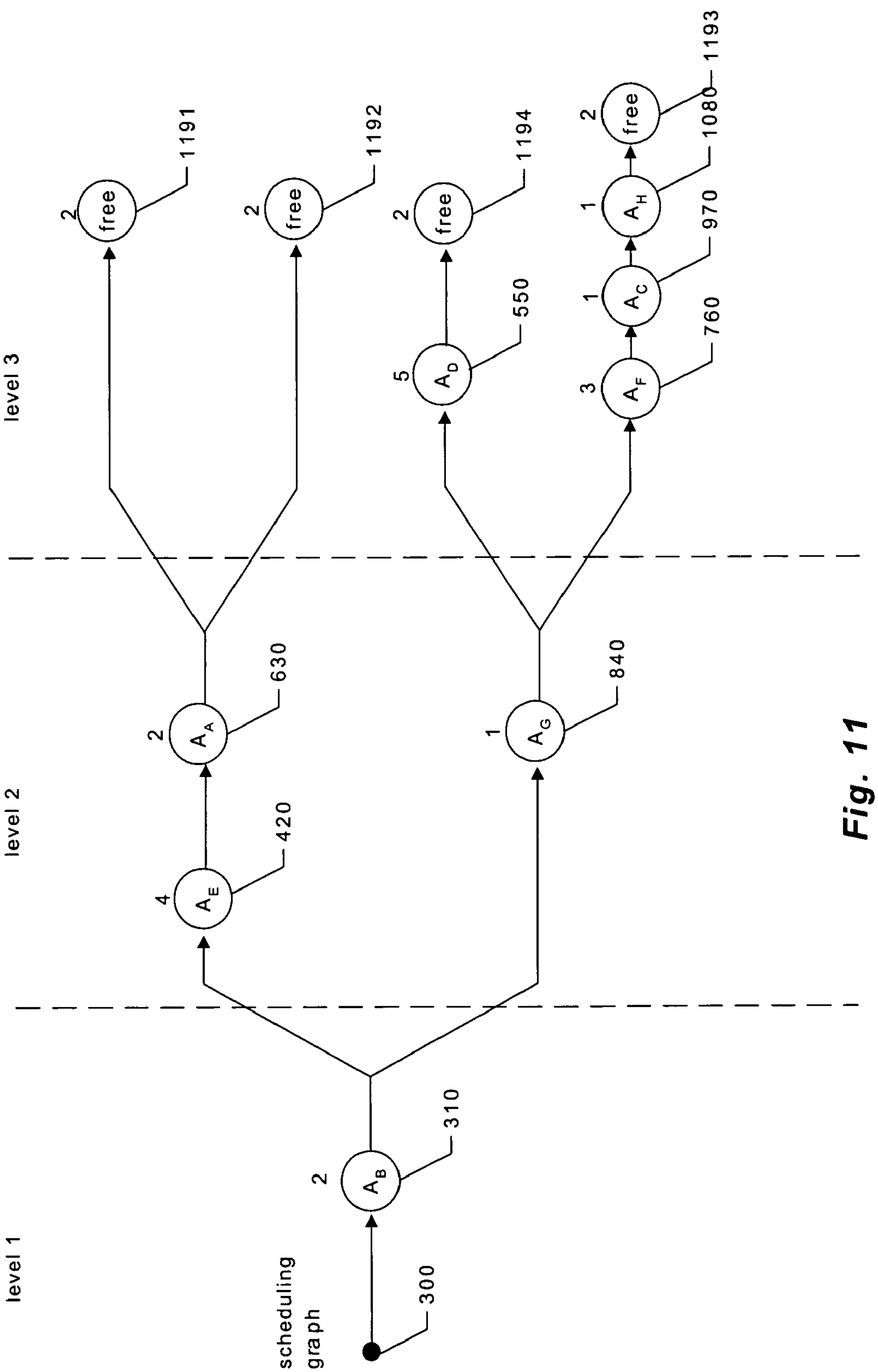

Returning to FIG. 2, in 206, the scheduler adds a free node to each path segment in the highest level of the graph having a minimum uncommitted weight greater than zero. Each free node created in 206 has a weight equal to the minimum uncommitted weight of its path segment. This renders zero the minimum uncommitted weight of every path segment of the graph. FIG. 11 shows the scheduler adding free nodes to the scheduling graph in 206. It can be seen from FIG. 11 that the scheduler has added free nodes 1191, 1192, 1193, and 1194, each having weight 2, to the path segments of level 3. As a result, each of the four root-to-leaf paths has a total path weight of 10, which is equal to the minimum reservation window. The root-to-path traversal of this graph will cause the scheduler to satisfy the reservations shown in Table 1 with regularity.

Figure 12:
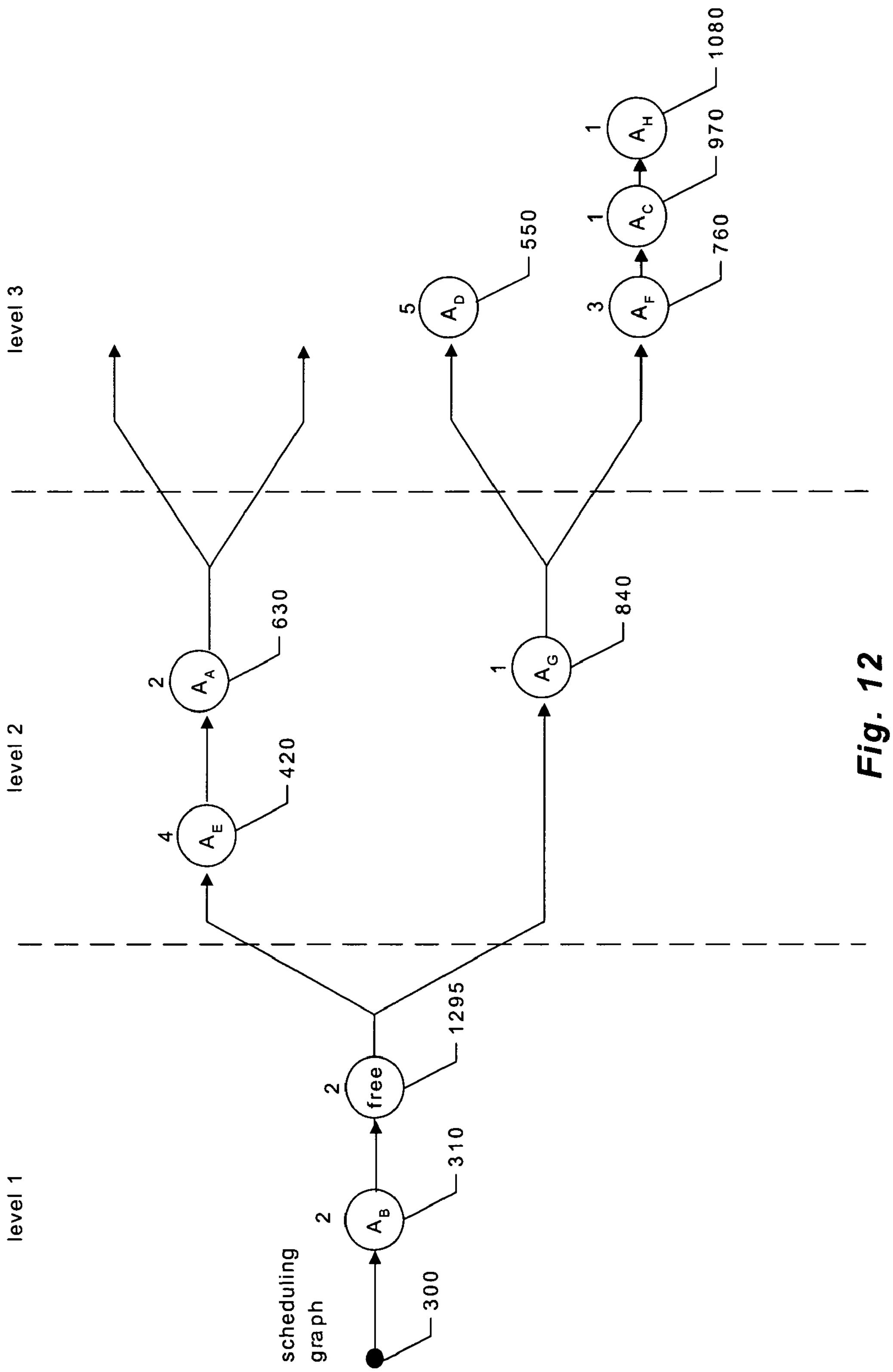

Returning to FIG. 2, in 207, the scheduler optimizes the graph to minimize the number of nodes and otherwise improve the efficiency of its storage and traversal. One way in which the scheduler optimizes the graph is by combining two nodes that occur in path segments after a particular branch into a single node in the path segment before that branch. FIG. 12 shows an example of the scheduler combining two identical nodes to optimize the sample scheduling graph. It can be seen by comparing FIG. 12 to FIG. 11 that nodes 1191, 1192, 1193, and 1194 (FIG. 11), which are all free nodes in level 3 having a weight of 2, have been replaced with node 1295 (FIG. 12), a free node in level 1 having weight 2. While this modification of the scheduling graph has reduced the number of nodes in the scheduling graph, the modified scheduling graph is similar to the scheduling graph shown in FIG. 11, as both of the top two root-to-leaf paths contain a free node having weight 2, albeit at a different position in these paths. After optimizing the graph in 207, the method concludes.

When the scheduler schedules the threads of activities in accordance with the scheduling graph shown in FIG. 12 by traversing the scheduling graph in root-to-leaf order, the activities are executed in the order and for the execution times shown in Table 3.

TABLE 3

| Activity | Execution Time |
|---|---|
| $A_B$ | 2 |
| free | 2 |
| $A_E$ | 4 |
| $A_A$ | 2 |
| $A_B$ | 2 |
| free | 2 |
| $A_G$ | 1 |
| $A_D$ | 5 |
| $A_B$ | 2 |
| free | 2 |
| $A_E$ | 4 |
| $A_A$ | 2 |
| $A_B$ | 2 |
| free | 2 |
| $A_G$ | 1 |
| $A_F$ | 3 |
| $A_C$ | 1 |
| $A_H$ | 1 |

The scheduler traverses each path by beginning at the root of the graph and traversing toward the leaves at each branch encountered while traversing toward the leaves, the scheduler follows the edge out of the branch that has been followed less recently than the other edge out of the branch. First, the scheduler traverses the nodes in the first path of the scheduling graph: activity $A_B$ node 1210, free node 1295, activity $A_E$ node 1220, and activity $A_A$ node 1230. Note that his involves following the top edge in the branch from free node 1295. When this branch is next encountered, the scheduler will follow the bottom edge from this branch. The scheduler then traverses the second path, containing activity $A_B$ node 1210, free node 1295, activity $A_G$ node 1240, and activity $A_D$ node 1250. The scheduler then traverses the third path of the scheduling graph, which is the same as the first path. Finally, the scheduler traverses the fourth path of the scheduling graph, containing activity $A_B$ node 1210, free node 1295, activity $A_G$ node 1240, activity $A_F$ node 1260, activity $A_C$ node 1270, and activity $A_H$ node 1280. The traversal of these four paths constitutes a complete traversal of the scheduling graph. Because the scheduler continues to cycle through complete traversals of the scheduling graph, after traversing the fourth path of the scheduling graph, the scheduler again traverses the first path of the scheduling graph. Those skilled in the art will appreciate that, if the activities of the example are executed as shown in Table 3, each of the reservations will be satisfied. In fact, not only will the reservations for the activities be satisfied for particular reservation windows, but they will be satisfied for every period of time having the same length as the reservation window length.

Figure 13A:
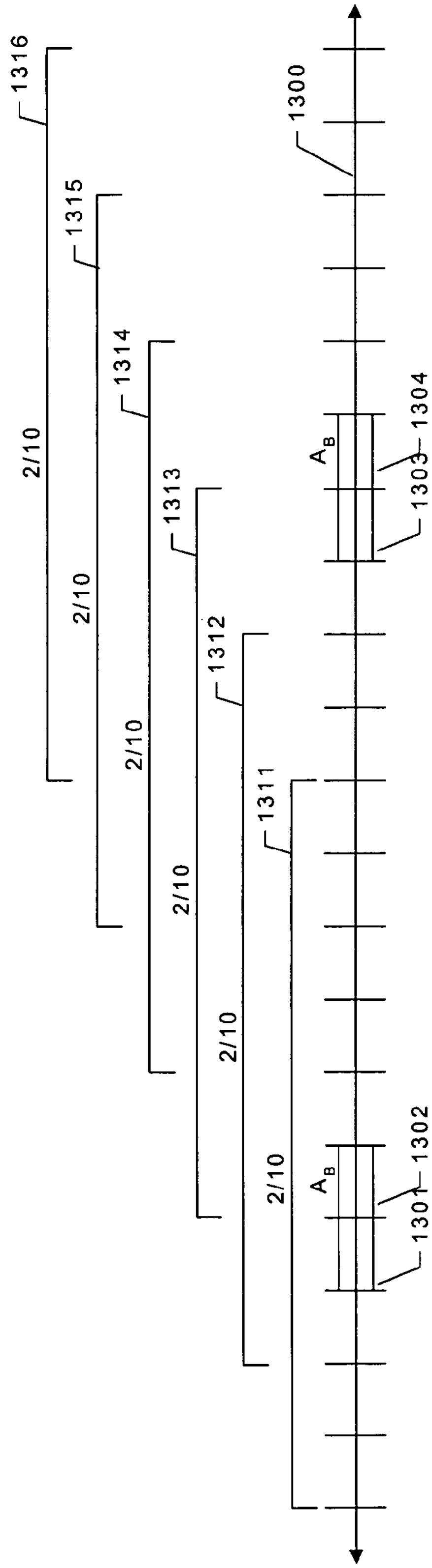
FIG. 13A is a timing diagram showing the execution of a reservation in accordance with the sample scheduling graph.

FIG. 13A is a timing diagram showing the execution of activity $A_B$ in accordance with the sample scheduling graph. FIG. 13A shows that activity $A_B$ is executed for 2 times units every 10 time units, the reservation window length for the reservation for activity $A_B$. That is, activity $A_B$ is executed for periods 2 time units long that begin exactly 10 time units apart. It can be seen that, as a result, sample time periods 1311, 1312, 1313, 1314, 1315, and 1316, all 10 time units long, each include 2 time units in which threads of activity $A_B$ are being executed. (These sample time periods are illustrative of the infinite number of time periods 10 time units long starting at different times, during each of which threads of activity $A_B$ are executed for 2 time units.) For example, time periods 1311 and 1312 both contain execution time periods 1301 and 1302 in which threads of activity $A_B$ are being executed. Time period 1313 contains execution time periods 1302 and 1303. Time periods 1314, 1315, and 1316 all contain execution time periods 1303 and 1304.

Figure 13B:
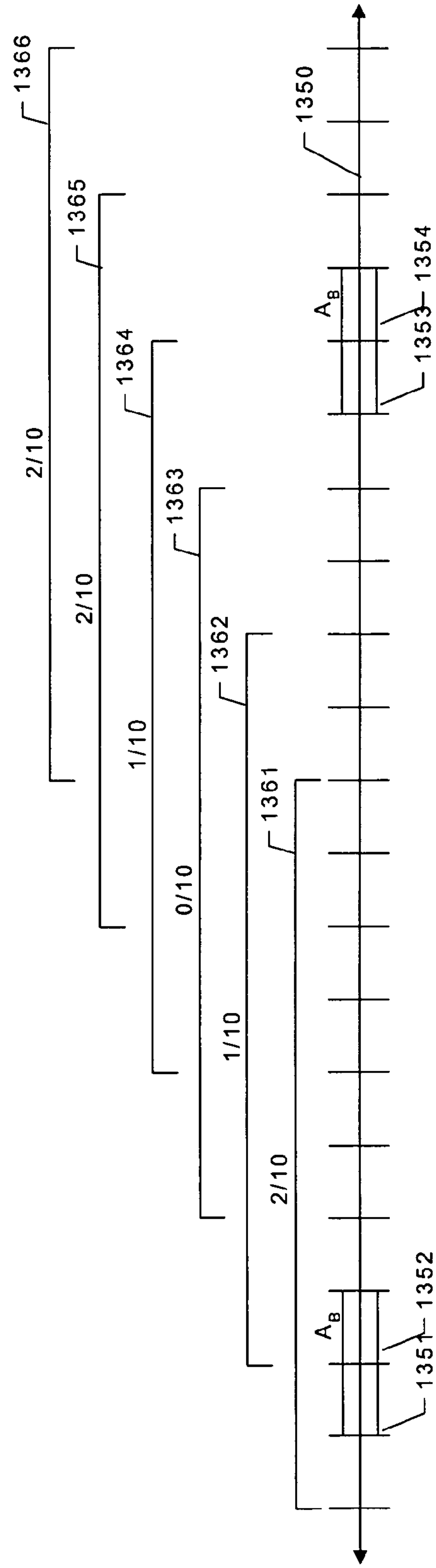
FIG. 13B is a timing diagram showing the conventional execution of a reservation.

By way of contrast, FIG. 13B is a timing diagram showing a more conventional execution of a reservation. It can be seen that there are several time periods 10 time units long in which the threads of activity $A_B$ are executed for the reservation amount of 2 time units: time periods 1361, 1365 and 1366. However, there are also several time periods corresponding to the reservation window length during which activity $A_B$ is executed for less than its reservation amount: threads of activity $A_B$ are executed for only one time unit during time periods 1362 and 1364, and are executed for 0 time units during period 1363. Because there are some periods of time having the same length as the reservation window during which threads of the activity are executed for less than the activity's reservation amount, the conventional approach depicted in FIG. 13B is said to schedule activities and satisfy reservations with less regularity than the scheduler of the present invention.

When the scheduler is started, it constructs a scheduling graph for satisfying initially-pending reservations as described above. Also, when a new reservation is submitted by an activity, the scheduler may need to completely reconstruct the scheduling graph, as is discussed in more detail below. However, when the scheduler receives a new reservation, it first attempts to revise the existing scheduling graph to accommodate the new reservation before constructing a new scheduling graph.

Multiprocessor Considerations

As described, the example of the preceding section of the detailed description is for implementation on a uniprocessor, continuous-clock system. Implementation of the example on a multiprocessor system requires one or more of the following changes. First, either one scheduling graph can be constructed per processor, or a single scheduling graph can be utilized for all processors with a modification to the structure utilized. With respect to the latter, each node entry can be modified to signify the particular processor on which the thread of the node is to be executed, for example. It is noted that the latter in general may be optimal in the case of tightly coupled parallel-run applications, while the former in general may be optimal in the case of unrelated parallel-run applications. Furthermore, in one embodiment, some processors may share a single graph to indicate that tightly coupled applications are run on these processors, while other processors each have their own graph to indicate that unrelated applications are run on these latter processors. Other heuristics governing the number of scheduling graphs vis-à-vis the number of processors are also possible, as described later in the application.

While in the case of a uniprocessor system, there is only one processor on which any thread can be run, in the case of a multiprocessor system, a decision must be made as to which processor to schedule the execution of a given thread. This involves a heuristic, any specific heuristic of which the invention is not so limited. In one embodiment, the heuristic is to place a new reservation on the currently least loaded processor; if the reservation does not fit on the currently least loaded processor, then the next least loaded processor is checked, etc. In another embodiment, the heuristic is to place a new reservation on the processor for which similarly windowed reservations have previously been placed. For example, in the example of Table 1, activities $A_A$ and $A_G$ may be placed on one processor, since they both have reservation windows of 20; activities $A_C$, $A_D$, $A_F$ and $A_H$ may be placed on another processor, since they have reservations windows of 40; etc. In other words, reservations are grouped by processor according to identical reservation windows. This minimizes switching costs, as can be appreciated by those of ordinary skill within the art. Another, simpler, heuristic is to simply randomly assign a new activity to a processor.

Heuristics are used in general because an exhaustive search to determine the optimal processor on which to place a new reservation, based on switching costs and other governing criteria, can quickly become too expensive from a processing standpoint. However, when only a small number of activities have already been scheduled, such an exhaustive search may still be feasible and desirable. Therefore, in one embodiment, an exhaustive search is performed to determine which processor to schedule a new reservation on if the total number of reservations is still lower than a predetermined number (for example, 11). If the total number of reservations is higher than the predetermined number, then a heuristic such as has been described is used.

Discrete-Clock Considerations

In the example, it was implicitly assumed that a continuous-clock system was present. Continuity allows for an exact fraction of the total execution time of a processor to be used, corresponding to the amount required for a given reservation.

However, in some operating systems, such as Windows NT, the clock may in fact be discrete, such that the unit of time used has a granularity interfering with exact fractioning of the total execution time of a processor to be used.

For example, compare the previously provided Table 1 with Table 1B below, where the activity reservations are made on a discrete-clock system having a minimum granularity of 2 units.

TABLE 1B

| Activity | Desired Amount Reserved | Desired Reservation Window | Actual Amount Reserved/ Actual Reservation Window | Theoretical/Actual Fraction of Total Execution Time |
|---|---|---|---|---|
| $A_A$ | 2 | 20 | 2/20 | 10%/10% |
| $A_B$ | 2 | 10 | 2/10 | 20%/20% |
| $A_C$ | 1 | 40 | 2/40 | 2.5%/5% |
| $A_D$ | 5 | 40 | 6/40 | 12.5%/15% |
| $A_E$ | 6 | 30 | 4/20 | 20%/20% |
| $A_F$ | 3 | 40 | 4/40 | 7.5%/10% |
| $A_G$ | 1 | 20 | 2/20 | 5%/10% |
| $A_H$ | 1 | 40 | 2/40 | 2.5%/5% |
| | | | | 80%/95% |

By examination of Table 1B, it is noted that while theoretically the fraction of the total execution time is only 80% for activities $A_A$ through $A_H$, in reality, because of the minimum granularity of the clock's discrete units, the fraction is in fact 95%. This is because the minimum desired amount reserved for any activity is 2, and that the desired amount reserved must be a multiple of 2, which means that a desired reservation may have to be adjusted for this constraint. This does not affect activities $A_E$, for example, because its desired amount reserved is already a multiple of 2. However, for other reservation windows, the actual amount reserved per the actual reservation window is modified as compared to the desired amount reserved per the desired reservation window. For example, with respect to the activity $A_G$, 1 time unit out of 20 has been requested; however, the best the system can give is 2 time units out of 20. Thus, while only 5% of the execution window of 20 units was requested, in fact 10% of this window must be provided by the system, due to the minimum granularity of the clock's discrete units.

In making this modification, two underlying principles are employed: to ensure that the actual reservation is at least as great a fraction of the actual window as the desired reservation is of the desired window and to ensure that the actual window size is less than or equal to the desired window size. This ensures that the activity is given at least as great a share of time as it desired at least as often as desired.

For example, in the case of activity $A_D$, 5 of every 40 time units are desired. While the desired window of 40 time units can be given, the desired amount of 5 must be rounded up to 6. In the case of $A_F$, the desired window of 30 is not a power-of-two multiple of the base period of 10, hence the window granted is rounded down to the next smallest power-of-two multiple, 20. The desired amount of 6 is then scaled by the same ratio 20/30, resulting in a new amount of 4. Since this is an integer multiple of the clock granularity, no rounding is necessary in this case.

Adjusting reservation and constraint values has one negative consequence, however. As shown in Table 1, while theoretically the total fraction of execution time is only 80%, in reality, because of adjustments made to the reservations, the total fraction of execution time is 95%. Thus, a situation can exist where without consideration of the granularity of the system clock a given number of activities can easily be scheduled with time to spare, while when considering the granularity of the system clock, as must be done, the activities may not be all scheduleable.

New Reservation

In this section of the detailed description, how a new reservation is added to an existing scheduling graph by the scheduler is presented. The description is with reference to a uniprocessor, continuous-clock system. However, those of ordinary skill within the art can appreciate that the description can be extended to apply to multiprocessor and/or discrete-clock systems, as has been described in the previous two sections of the detailed description, as well.

Figure 14:
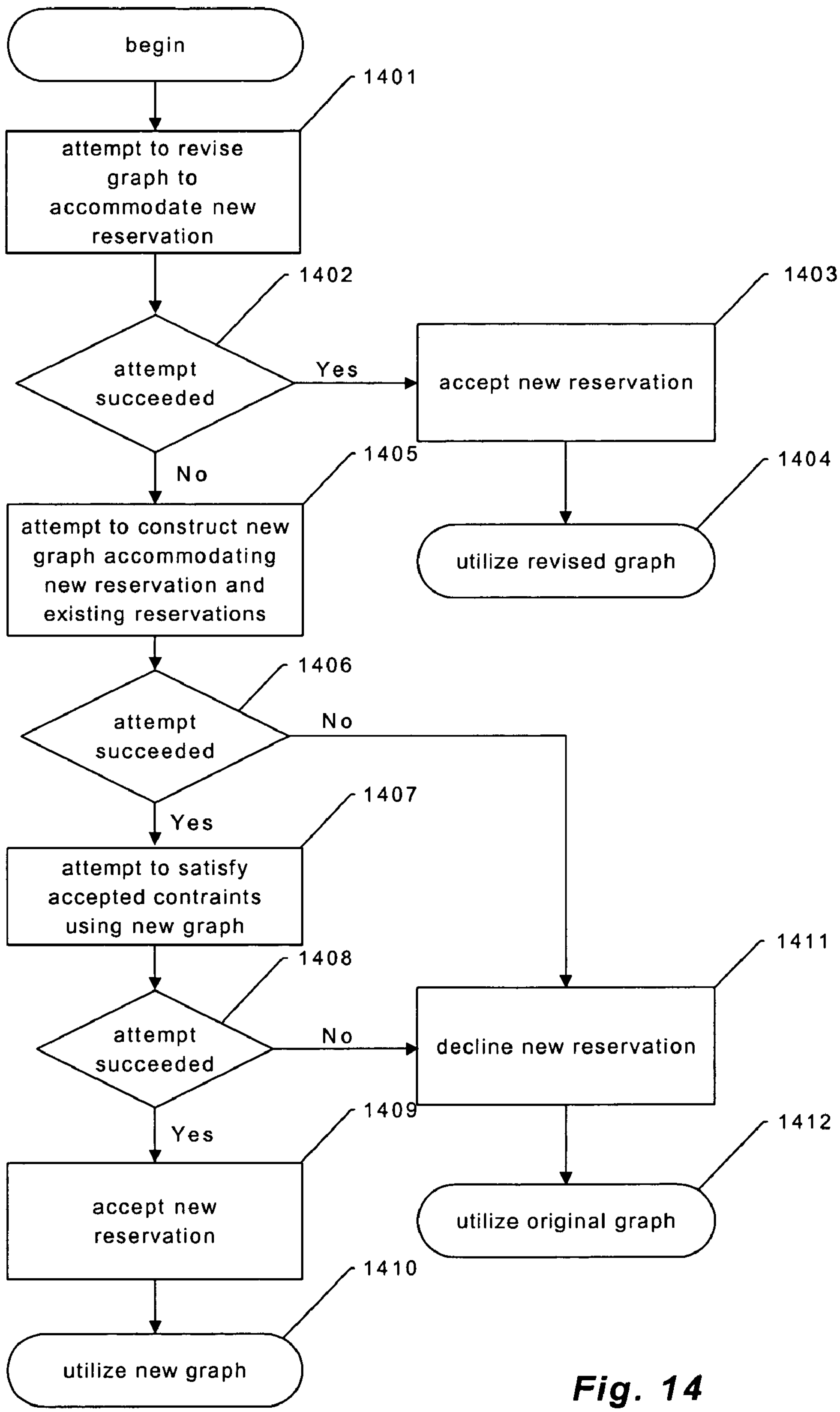
FIG. 14 is a flow diagram showing the method performed by the scheduler to process a submitted reservation in one embodiment.

FIG. 14 is a flow diagram showing the method performed by the scheduler to process a submitted reservation. In 1401, the scheduler attempts to revise the scheduling graph to accommodate the new reservation. In 1402, if the attempt of 1401 succeeded, then the scheduler continues at 1403, else the scheduler continues at 1405. In 1403, the scheduler accepts the new reservation, which was successfully accommodated by revising the graph in 1401. Then, in 1404, the scheduler utilizes the revised scheduling graph, and the method concludes. In 1405, the scheduler attempts to construct a new graph accommodating the new reservation as well as existing reservations in the manner discussed above in conjunction with FIGS. 3–12. In 1406, if the attempt of 1405 succeeded, then the scheduler continues at 1407, else the scheduler continues at 1411. In 1407, the scheduler attempts to satisfy the attempt using the new scheduling graph constructed in 1405. In 1408, if the attempt of 1407 succeeded, then the scheduler continues at 1409, else the scheduler continues at 1411. In 1409, the scheduler accepts the new reservation accommodated by the new scheduling graph constructed in 1405. Then, in 1410, the scheduler utilizes the scheduling graph constructed in 1405 and the method concludes. In 1411, because the scheduler was unable to provide the scheduling graph or construct a new scheduling graph accommodating the new reservation, existing reservations, and accepted constraints, the scheduler declines the new reservation. In an alternative embodiment, in 11, instead of declining the new reservation, the scheduler returns a future time after which the reservation will be granted, and creates a deferred reservation that becomes effective at that time. Then, in 1412, the scheduler utilizes the original scheduling graph. The method then concludes.

Figure 15:
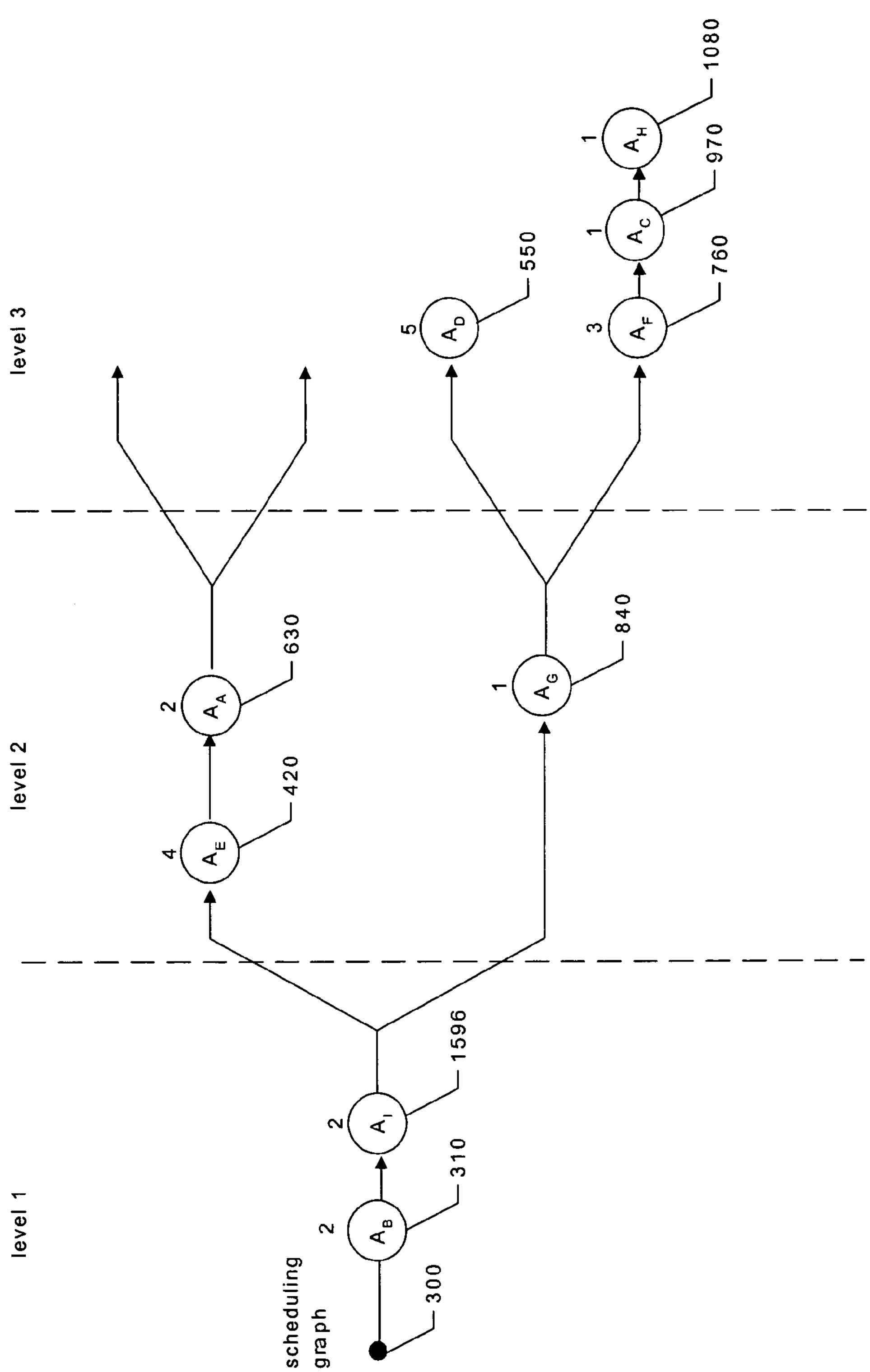
FIG. 15 is a scheduling graph diagram showing the dedication of a free node to an activity in order to accommodate a new reservation.

FIG. 15 is a scheduling graph diagram showing a modification of the existing sample scheduling graph shown in FIG. 12 to accommodate a new reservation for activity $A_I$ shown in Table 4.

TABLE 4

| Activity | Amount Reserved | Reservation Window | Fraction of Total Execution Time |
|---|---|---|---|
| $A_A$ | 2 | 20 | 10% |
| $A_B$ | 2 | 10 | 20% |
| $A_C$ | 1 | 40 | 2.5% |
| $A_D$ | 5 | 40 | 12.5% |
| $A_E$ | 6 | 30 | 20% |
| $A_F$ | 3 | 40 | 7.5% |
| $A_G$ | 1 | 20 | 5% |
| $A_H$ | 1 | 40 | 2.5% |
| $A_I$ | 2 | 10 | 20% |
| | | | 100% |

It can be seen from Table 4 that the new reservation for activity $A_I$ specifies a reservation amount of 2 time units and a reservation window length of 10 time units. The reservation window length of 10 time units places the activity in activity group 1, meaning that the scheduler will attempt to dedicate a node in the first level of the scheduling graph to activity $A_I$. Because the reservation amount is 2 time units, the scheduler will attempt to assign a free node in the first level of the scheduling graph having a weight of 2 to activity $A_I$. Because free node 1295 (FIG. 12) is in the first level of the scheduling graph and has weight 2, the scheduler dedicates the free node 1296 to activity $A_I$ in order to satisfy the new reservation for activity $A_I$.

In cases in which the new reservation has a reservation amount greater than the largest weight of any free node in the level of the scheduling graph corresponding to the reservation window length specified by the new reservation, the scheduler must manipulate the scheduling graph more extensively. In such cases, the scheduler must move free nodes from other levels of the scheduling graph to the level corresponding to the reservation window length for the new reservation. In the process, the scheduler must adjust the weight of the moved free node or nodes to maintain the total weight of the root-to-leaf paths along which the free nodes are moved.

Figure 16:
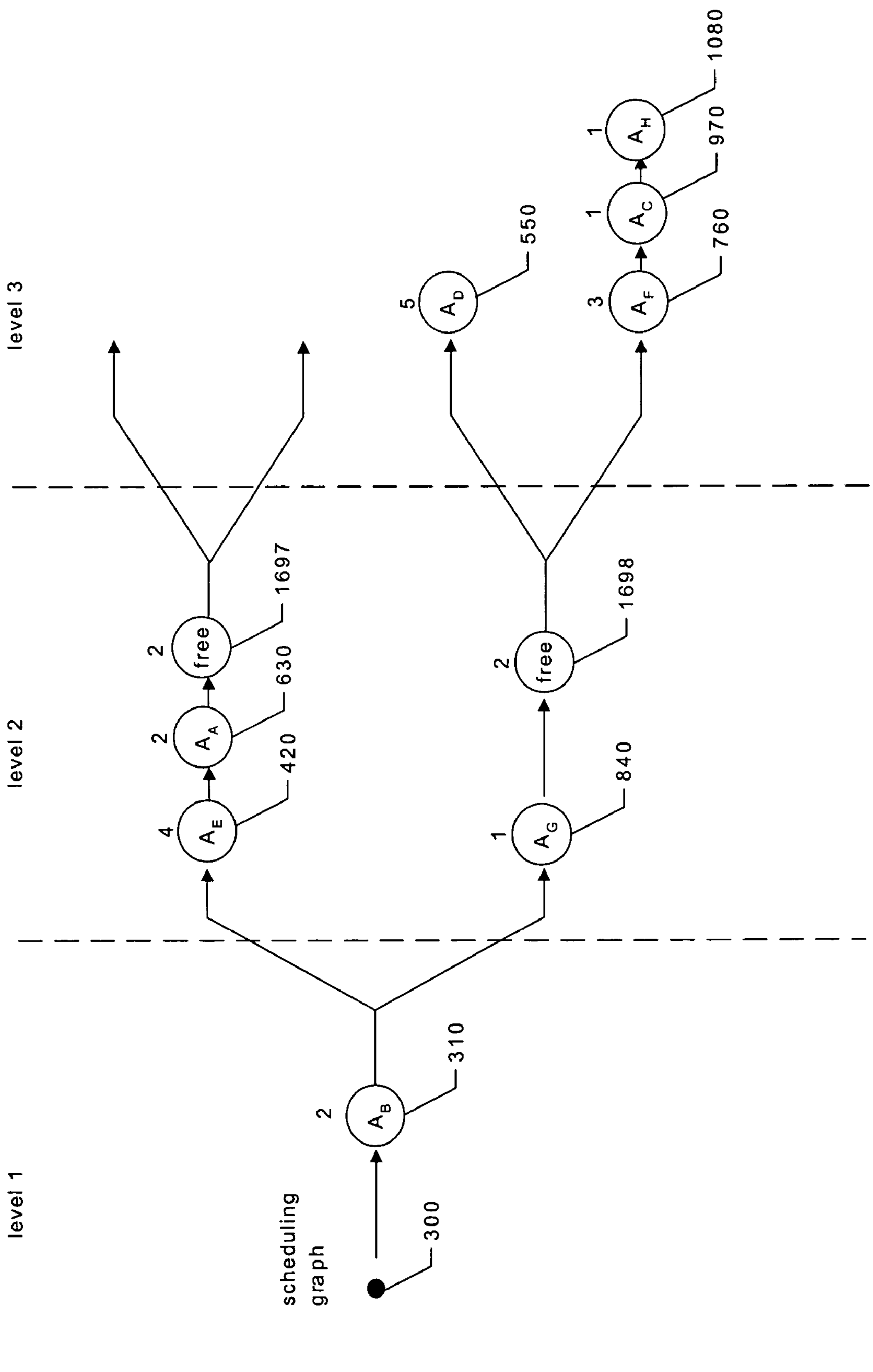
FIG. 16 is a scheduling graph diagram showing the relocation of free nodes to a different level to accommodate a new reservation.

FIG. 16 is a scheduling diagram showing the relocation of free nodes to a different level where necessary to accommodate a new reservation. As part of the example, while the scheduler is using the schedule graph shown in FIG. 12, activity $A_J$ submits a reservation as shown in Table 5.

TABLE 5

| Activity | Amount Reserved | Reservation Window | Fraction of Total Execution Time |
|---|---|---|---|
| $A_A$ | 2 | 20 | 10% |
| $A_B$ | 2 | 10 | 20% |
| $A_C$ | 1 | 40 | 2.5% |
| $A_D$ | 5 | 40 | 12.5% |
| $A_E$ | 6 | 30 | 20% |
| $A_F$ | 3 | 40 | 7.5% |
| $A_G$ | 1 | 20 | 5% |
| $A_H$ | 1 | 40 | 2.5% |
| $A_J$ | 2 | 20 | 10% |
| | | | 90% |

Because the new reservation for activity $A_J$ has a reservation window length of 40 time units, activity $A_J$ belongs to the second activity group. However, the second level of the scheduling graph shown in FIG. 12 contains no free nodes having a weight of at least 2 time units. The scheduler therefore splits free node 1295, on level 1, having a weight of 2 units (FIG. 12) into free nodes 1697 and 1698 in level 2 of the graph, each having a weight of 2 (FIG. 16).

Figure 17:
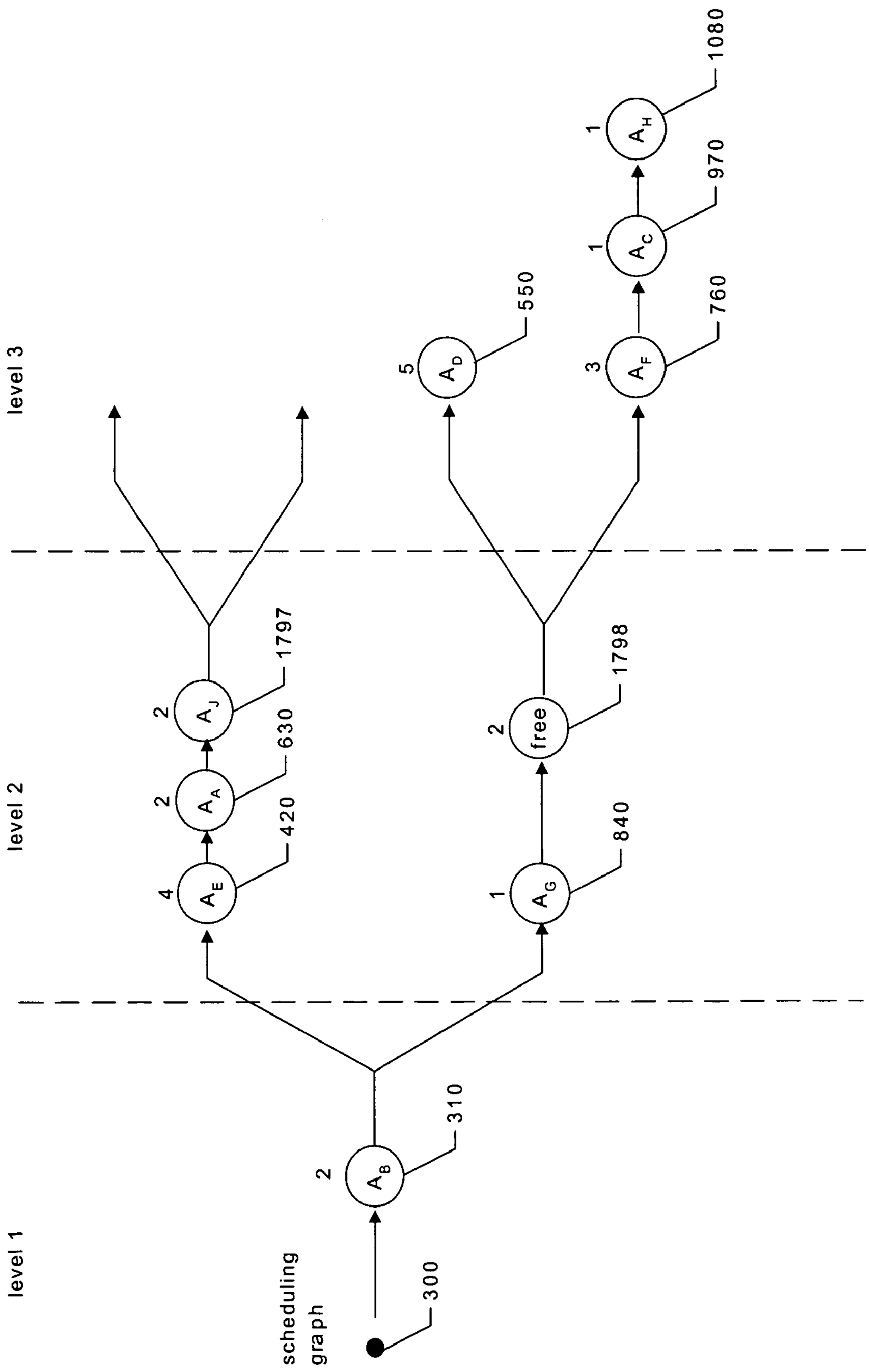
FIG. 17 is a scheduling graph diagram showing the dedication of the relocated free node to an activity in order to accommodate a new reservation.

FIG. 17 is a scheduling graph diagram showing the dedication of relocated free node 1797 to activity $A_J$ in order to accommodate the new reservation submitted by activity $A_J$. As can be seen from FIG. 17, the scheduler has thereby modified the scheduling graph to accommodate the new reservation submitted by activity $A_J$.

Ending a Reservation

In this section of the detailed description, how a reservation is ended is presented. The description is with reference to a uniprocessor, continuous-clock system. However, those of ordinary skill within the art can appreciate that the description can be extended to apply to multiprocessor and/or discrete-clock systems, as has been described earlier in the detailed description, as well.

Figure 18:
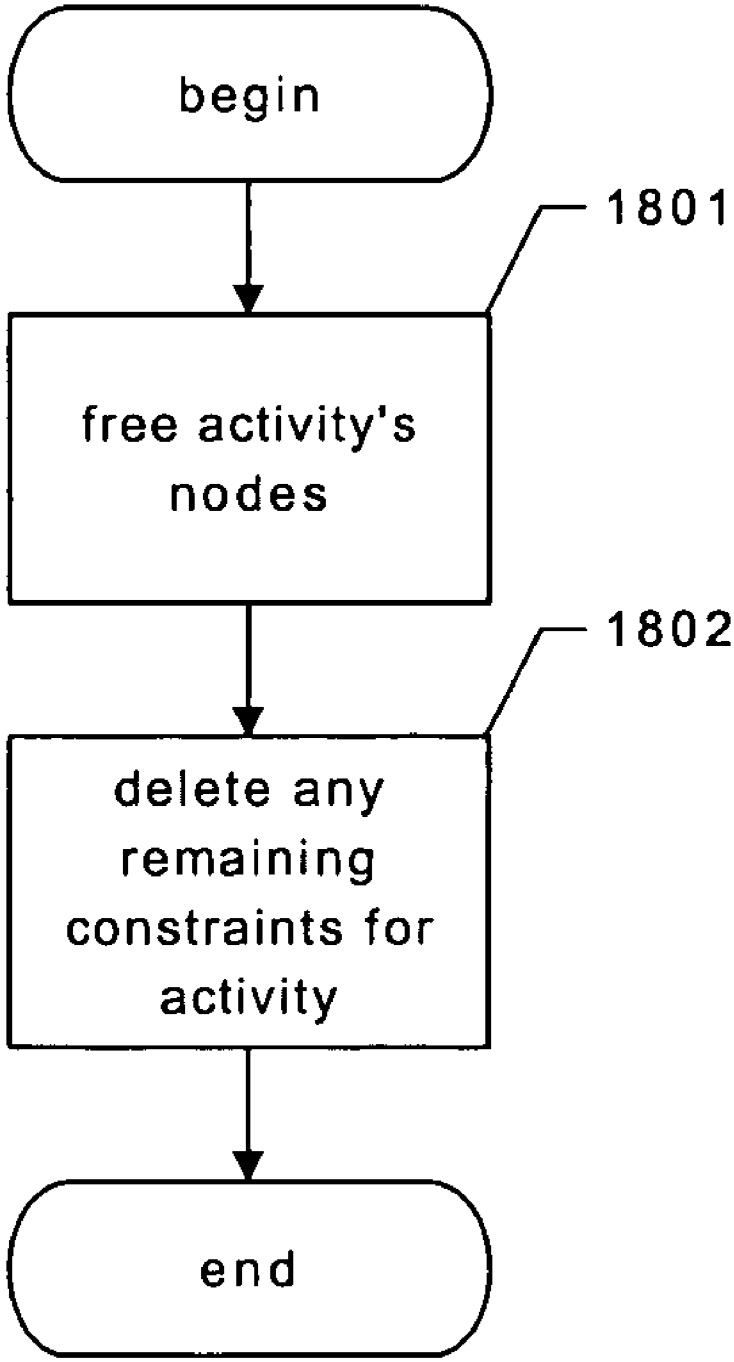
FIG. 18 is a flow diagram showing the method performed by the scheduler to end an accepted reservation in one embodiment.

When a reservation is ended by the activity that submitted it, the scheduler modifies the existing scheduling graph by converting any nodes dedicated to the submitting activity to free nodes. FIG. 18 is a flow diagram showing the method performed by the scheduler in order to end an accepted reservation. In 1801, the scheduler frees any nodes of the scheduling graph dedicated to the activity. In 1802, the scheduler deletes any remaining constraints submitted by threads of the activity. The method then concludes.

As part of the example, while the scheduler is using the scheduling graph shown in FIG. 12, activity $A_G$ ends its reservation, perhaps because activity $A_G$ is being terminated. This is shown in Table 6.

TABLE 6

| Activity | Amount Reserved | Reservation Window | Fraction of Total Execution Time |
|---|---|---|---|
| $A_A$ | 2 | 20 | 10% |
| $A_B$ | 2 | 10 | 20% |
| $A_C$ | 1 | 40 | 2.5% |
| $A_D$ | 5 | 40 | 12.5% |
| $A_E$ | 4 | 20 | 20% |
| $A_F$ | 3 | 40 | 7.5% |
| $A_H$ | 1 | 40 | 2.5% |
| | | | 75% |

Figure 19:
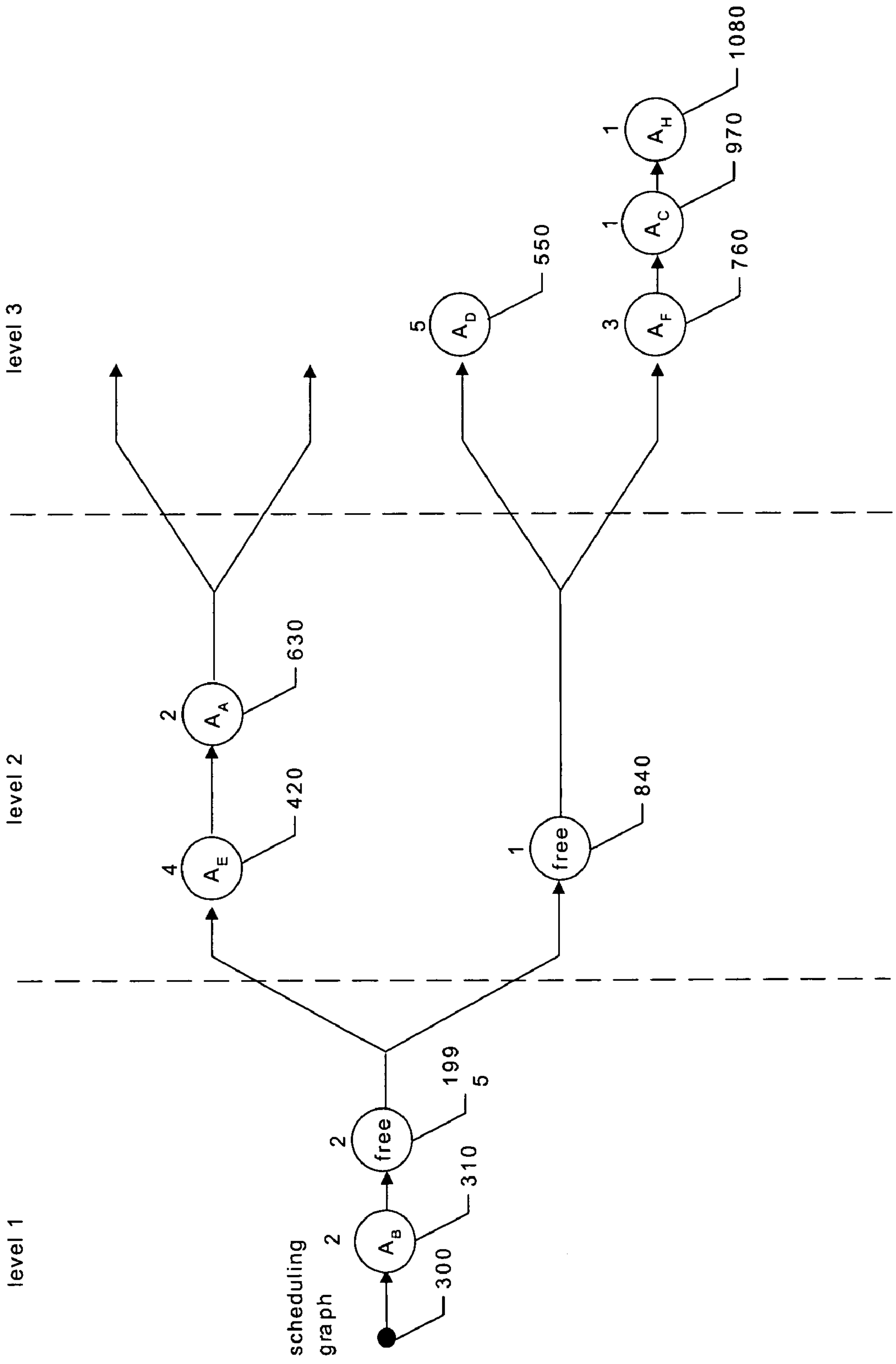
FIG. 19 is a scheduling graph diagram showing a dedicated node being freed to end an existing reservation.

FIG. 19 is a scheduling graph showing dedicated node 1240 (FIG. 12) being converted to free node 1940. Those skilled in the art will appreciate that the scheduling graph shown in FIG. 19 reflects the ending of the reservation for activity $A_G$, in that his scheduling graph contains no nodes dedicated to activity $A_G$.

In-Branching Factors

The scheduling graphs shown in the foregoing figures and discussed above each exhibit an in-branching factor of 1, meaning that one edge of the graph enters each node, and an out-branching factor of 2, meaning that non-root nodes that are the last nodes of a level have two etches exiting them. Alternative embodiments of the present invention use scheduling graphs having different in-branching and out-branching factors.

Figure 20:
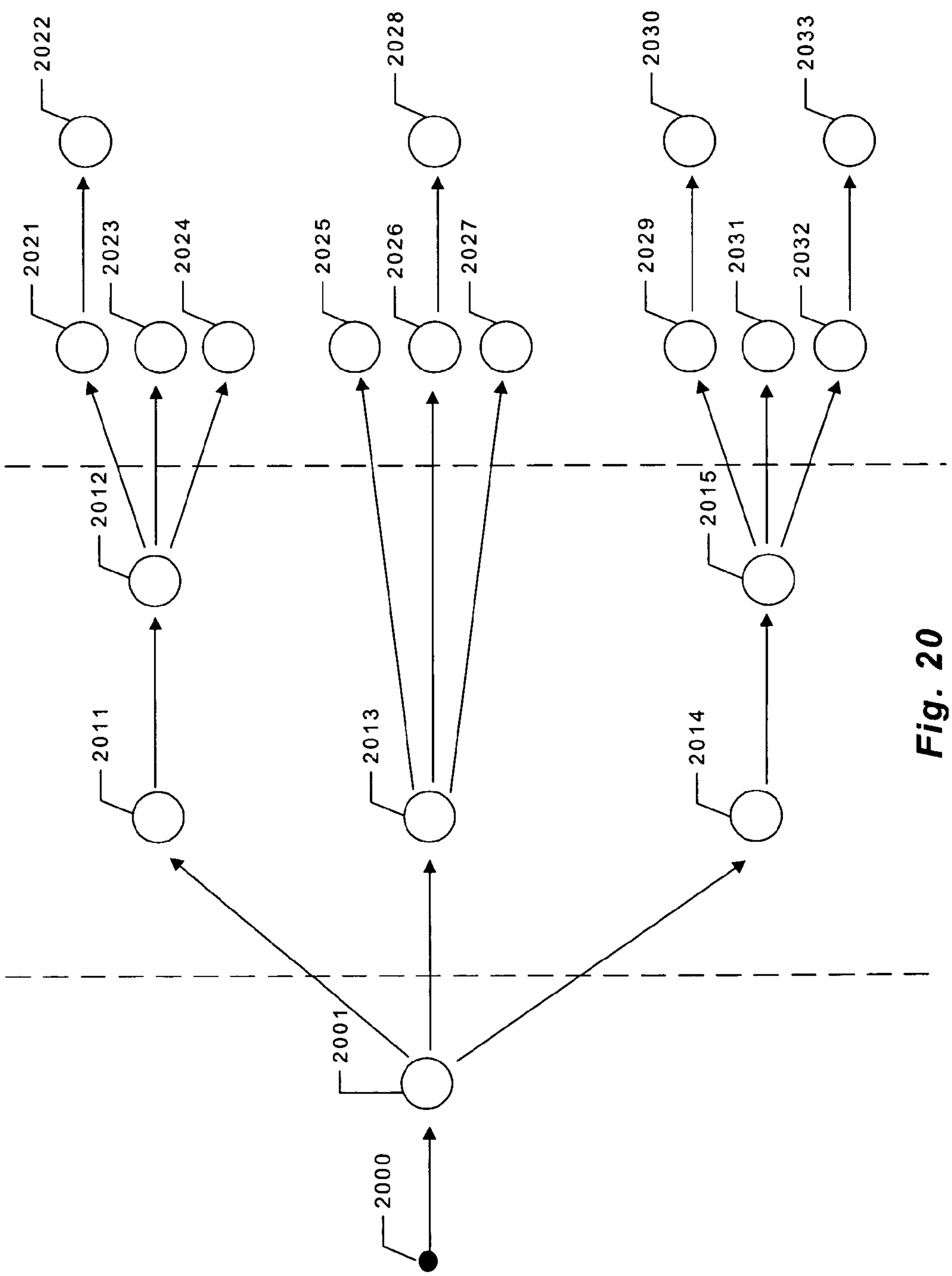
FIG. 20 is a scheduling graph diagram showing a scheduling graph having an out-branching factor of three.

FIG. 20 is a scheduling graph diagram showing the scheduling graph having an out-branching factor of 3. The scheduling graph in FIG. 20 has three levels. Level 1 includes node 2001. Level 2 includes nodes 2011, 2012, 2013, 2014, and 2015. Level 3 includes nodes 2021, 2022, 2023, 2024, 2025, 2026, 2027, 2028, 2029, 2030, 2031, 2032, and 2033. It can be seen that nodes 2001, 2012, 2013, and 2015, which are each the last node of a level and not a root node, are exited by three edges to three different nodes. It can further be seen that there are nine root-to-leaf paths in this graph. Path 1 includes nodes 2001, 2011, 2012, 2021, and 2022. Path 2 includes nodes 2001, 2011, 2012, and 2023. Path 3 contains nodes 2001, 2011, 2012, and 2024. Path 4 contains nodes 2001, 2013, and 2025. Path 5 includes nodes 2001, 2013, 2026, and 2028. Path 6 contains nodes 2001, 2013, and 2027. Path 7 contains nodes 2001, 2014, 2015, 2029, and 2030. Path 8 contains nodes 2001, 2014, 2015, and 2031. Path 9 contains nodes 2001, 2014, 2015, 2032, and 2033.

Figure 21:
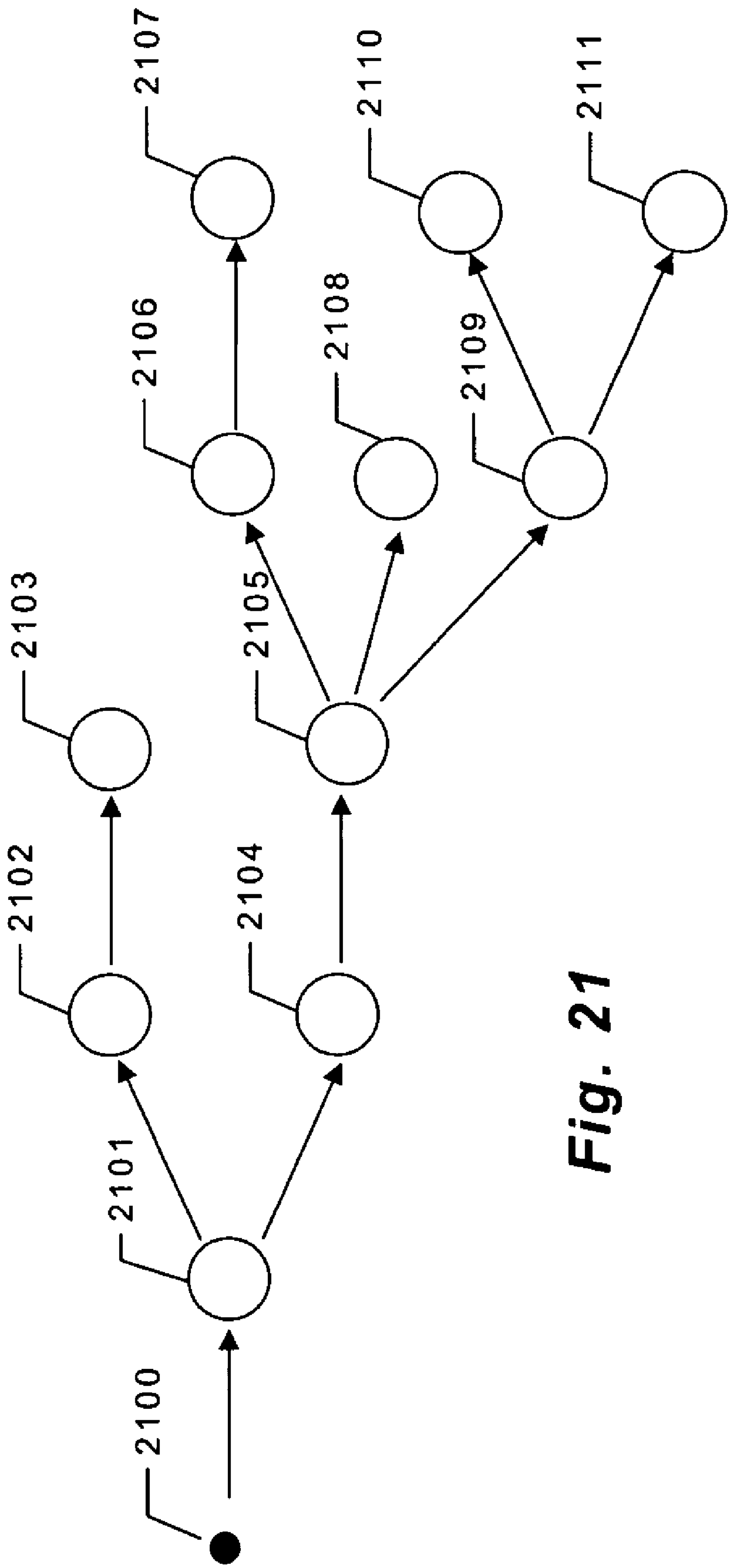
FIG. 21 is a scheduling graph diagram showing a scheduling graph having a variable out-branching factor.

FIG. 21 is a scheduling graph diagram showing a scheduling graph having a variable out-branching factor. The scheduling graph in FIG. 21 has five root-to-leaf paths. Path 1 contains nodes 2101, 2102, and 2103. Path 2 contains nodes 2101, 2104, 2105, 2106, and 2107. Path 3 contains nodes 2101, 2104, 2105, and 2108. Path 4 contains nodes 2101, 2104, 2105, 2109, and 2110. Path S contains nodes 2101, 2104, 2105, 2109, and 2111. It can be seen that nodes 2101 and 2109 each have two exiting edges, while node 2105 have three exiting edges. The difference in the number of exiting edges between these nodes characterizes this graph as having a variable out-branching factor. Because the graph has a variable out-branching factor, the assignment of nodes to specific levels is not possible.

Figure 22:
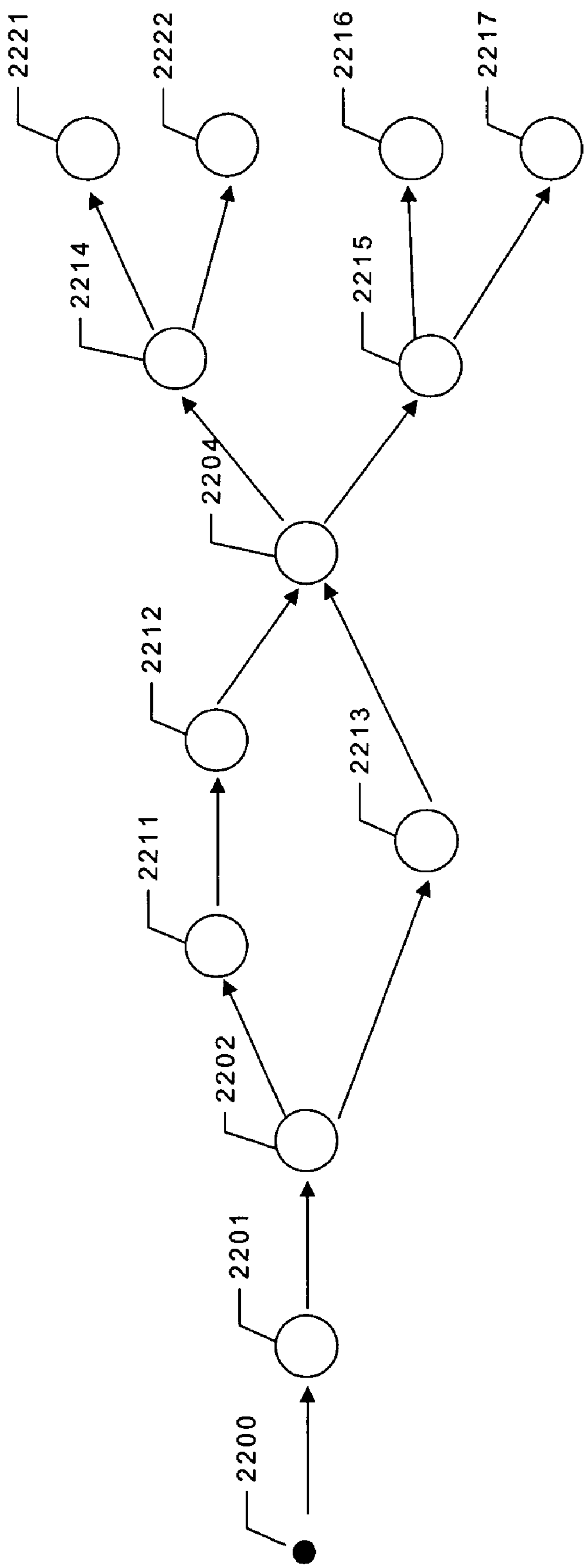
FIG. 22 is a scheduling graph diagram showing a scheduling graph exhibiting in-branching as well as out-branching.

FIG. 22 is a scheduling graph diagram showing a scheduling graph exhibiting in-branching, as well as out-branching. The scheduling graph in FIG. 22 has four root-to-leaf paths. Path I includes nodes 2201, 2202, 2211, 2212, 2204, 2214, and 2221. Path 2 includes nodes 2201, 2202, 2211, 2212, 2204, 2214, and 2222. Path 3 includes nodes 2201, 2202, 2213, 2204, 2215, and 2216. Path 4 includes nodes 2201, 2202, 2213, 2204, 2215, and 2217. It can be seen that node 2204 is entered by two edges from two different nodes. The scheduling graph therefore is said to exhibit in-branching. Thus, while node 2204 is further from the root of the graph than level 2 node 2211, 2212, and 2213, it is nonetheless a member of the first level, as it is included on as many paths as nodes 2201 and 2202.

Processing a Constraint

In this section of the detailed description, how a constraint is processed is presented. The description is with reference to a uniprocessor, continuous-clock system. In the following sections of the detailed description, the manner by which a constraint is processed as in a multiprocessor and/or discrete-clock system is then described.

Figure 23:
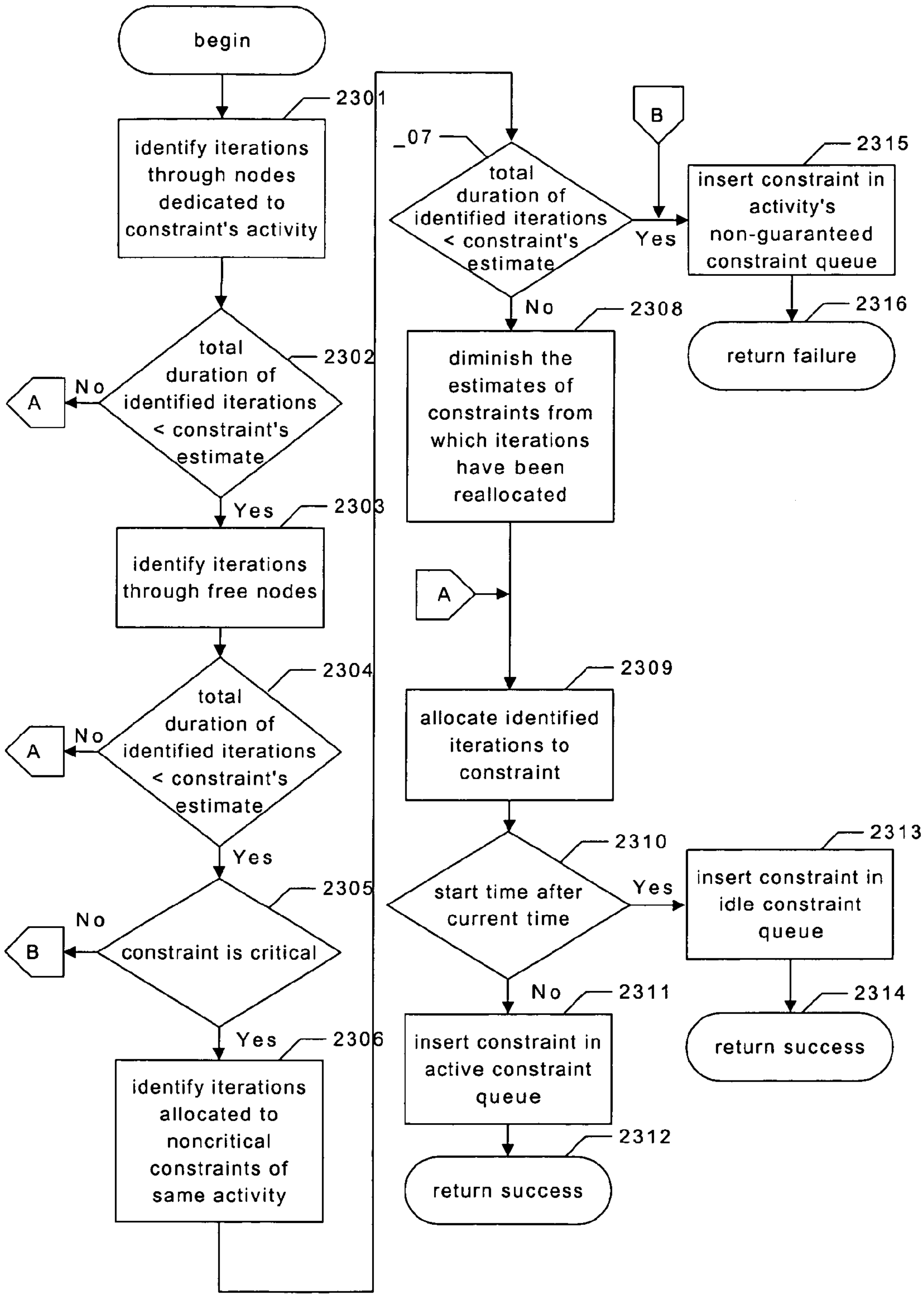
FIG. 23 is a flow diagram showing the method performed by the scheduler to process a submitted constraint in one embodiment.

FIG. 23 is a flow diagram showing the method performed by the scheduler to process a submitted constraint. In this method, the scheduler identifies future iterations through scheduling graph nodes that may be allocated to the constraints; if the total duration of these identified iterations is at least as large as the execution time estimate of the constraint, then the identified intervals are allocated to the constraint and the constraint is accepted, otherwise the constraint is declined. In 2301, the scheduler identifies unallocated future iterations through scheduling graph notes that are dedicated to the activity to which the thread submitting the constraint belongs that are between the start time and deadline for the constraint, up to a total duration equal to the execution time estimate of the constraint. The performance of 2301 is discussed in conjunction with FIG. 24. FIG. 24 is a scheduling graph detail diagram showing the constraints to which iterations through a sample scheduling graph node are initially dedicated. FIG. 24 shows detail of scheduling graph node 1250 (FIG. 12). It shows that, associated with the node 1250/2450 dedicated to activity $A_C$, the scheduler stores for upcoming iterations through the node an indication of the constraint to which the upcoming iteration through the node or portion thereof is allocated. For example, it can be seen from FIG. 24 that the next iteration through node 2450 at time 125 is allocated to constraint $C_{C1}$. It can also be seen that the iterations starting at times 205 through 405 have not been allocated to any constraint, and are available for allocation to constraints submitted by threads of activity $A_C$.

FIG. 25 is a scheduling graph detail diagram showing the allocation of specific traversals of the node to a new constraint. As part of the example, thread $t_{C1}$, submits the constraint shown in Table 15 while the scheduler is in the state shown in FIG. 24. It can be seen that, in accordance with 2301, the scheduler identifies for allocation to constraint $C_{C2}$ the upcoming iterations of the node starting at times 245 through 365.

TABLE 7

| Constraint | Activity | Thread | Start Time | Deadline | Execution Time Estimate | Critical |
|---|---|---|---|---|---|---|
| $C_{C2}$ | $A_C$ | $t_{C1}$ | 235 | 495 | 4 | No |

Because the weight of the node 2550 is 1, each allocation of an iteration through the node allows the constraint to which it is allocated to execute for 1 time unit. Therefore, the allocation of four iterations through the node will enable constraint $C_{C2}$ to execute for its entire estimate of 4 time units. Further, these iterations are between the start time and the deadline. For these reasons, if the constraint $C_{C2}$ is executed in accordance with these allocations, constraints $C_{c2}$ will be successfully completed. It should be noted that iterations in nodes need not be selected in their entirety for allocation to a constraint. Rather, in 2301, 2303, and 2306, the facility may select only a portion of the duration of the iterations for a node for assignment to the submitted constraint. The remainder of the duration of the iteration through the node remains allocated in any manner it was previously.

Returning to FIG. 23, in 2302, if the total duration of the intervals identified in 2301 is less than the execution time estimate specified by the constraint, then the scheduler continues at 2303, else the scheduler continues at 2309. In 2303, the scheduler identifies unallocated future iterations through free nodes in the same manner discussed above in conjunction with 2301. In 2304, if the total duration of the intervals identified in 2301 and 2303 is less than the execution time estimate specified by the constraint, then the scheduler continues at 2305, else the scheduler continues at 2309. If the submitted constraint is critical, then the scheduler continues at 2306, else the scheduler continues to 2315.

The example includes the receipt of the critical constraint shown in Table 8 while the scheduler is in the state shown in FIG. 25. In 2306, the scheduler identifies iterations through nodes that have been allocated to non-critical constraints of the same activity.

TABLE 8

| Constraint | Activity | Thread | Start Time | Deadline | Execution Time Estimate | Critical |
|---|---|---|---|---|---|---|
| $C_{C3}$ | $A_C$ | $t_{C3}$ | 200 | 400 | 5 | Yes |

FIG. 26 is a scheduling graph detail diagram showing the reallocation of specific traversals through a node to the critical constraint. FIG. 26 shows the identification of iterations occurring at times 245 through 365 previously allocated to noncritical constraint $C_{C2}$ for reallocation to critical constraint $C_{C3}$ in accordance with 2306.

Returning to FIG. 23, in 2307, if the total duration of the iterations identified in 2301, 2303, and 2306 are less than the execution time estimate specified by the submitting constraint, then the scheduler continues in 2315, else the scheduler continues in 2308. In 2308, for each constraint from which iterations were identified for reallocation to the submitted constraint in 2306, the scheduler reduces the estimate of the constraint by the total duration of the intervals identified for reallocation to the submitted constraint from the constraint in 2306. This process of reassigning intervals already allocated to non-critical constraints of the same activity allows critical constraints to be accepted and satisfied in situations in which they otherwise could not be. The corresponding reduction in the estimates of the constraints from which intervals are reallocated causes these constraints to exhaust their estimates earlier than expected and be moved to the non-guaranteed queues for their activities to be completed at a priority level inferior to active constraints, but superior to threads on the circular thread queues for each activity.

Figure 27:
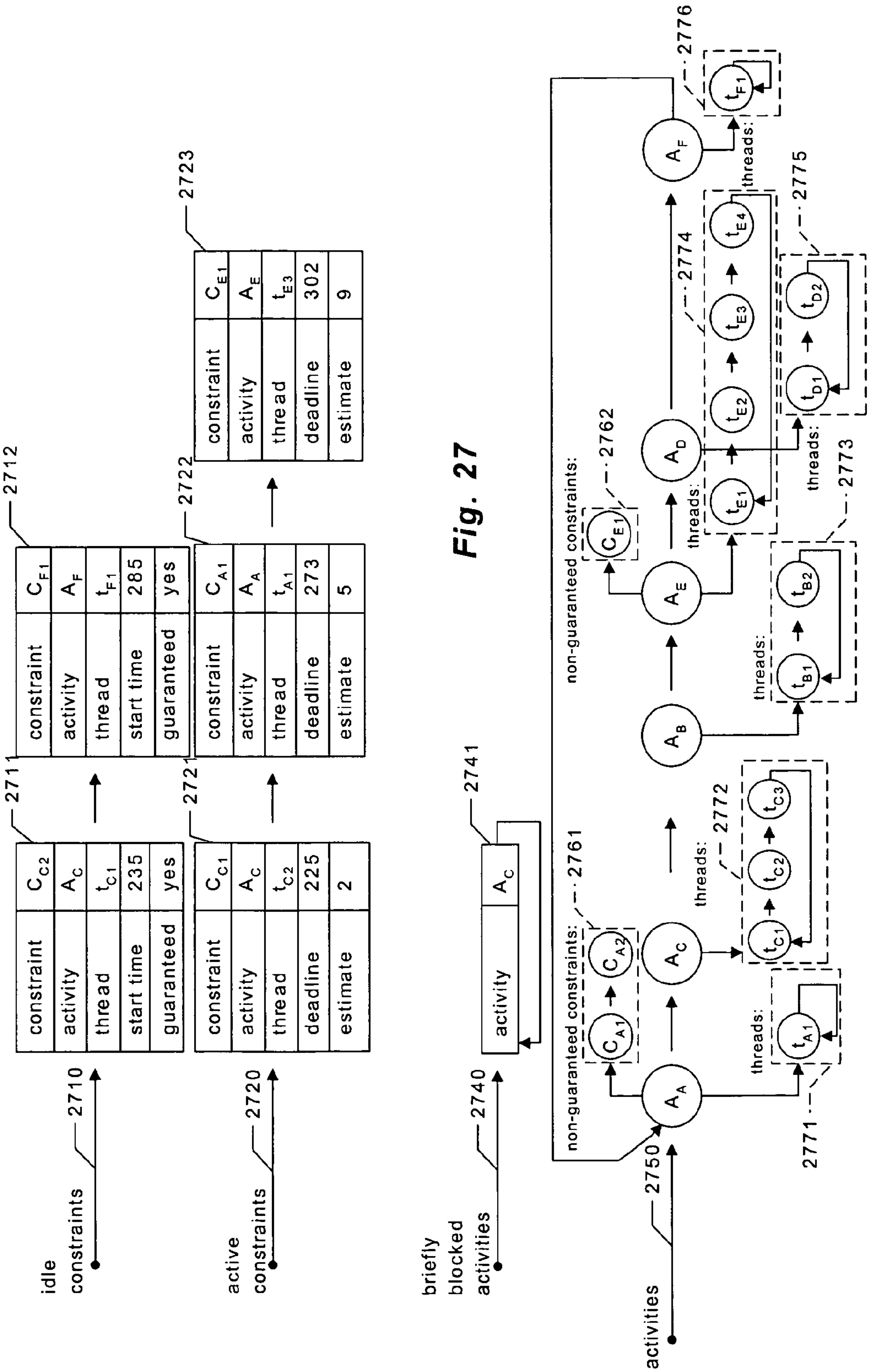
FIG. 27 is a scheduling data structure diagram showing the queues used by the scheduler to maintain the current scheduling state.

FIG. 27 is a scheduling data structure diagram showing the queues used by the current scheduling state. The diagram shows a number of queues each containing activities and constraints that will eventually be executed. An idle constraint queue 2710 contains constraint records 2711 and 2712. The idle constraint queue 2710 contains constraint records for constraints that have been accepted, but whose start time is in the future. The constraint records in the idle constraint queue 2710 are sorted by start time so that the earliest start time resides at the head of idle constraints queue. An active constraints queue 2720 contains constraint records 2721, 2722, and 2723. The constraint records in the active constraint queue 2720 contain records for constraints whose start times have passed, and are therefore "active." The constraints on the active constraint queue are those that have a remaining execution time estimate greater than zero—any threads that have exhausted their execution time estimate have been moved to a non-guaranteed constraint list for their activity, as discussed below. The constraint records in the active constraint queue 2720 are sorted by deadline so that the earliest deadline resides at the head of the queue. A round-robin activity queue 2750 is a circular list of all of the activities known to the scheduler. The round-robin activity queue 2750 in one embodiment contains both programs that have submitted reservations and programs, such as non-real-time programs, that have not submitted reservations. Each activity in the list has an ordered list of non-guaranteed constraints submitted by its threads (e.g., non-guaranteed constraint 2761 of activity $A_A$), which may include constraints not initially accepted by the scheduler and constraints that were accepted by the scheduler but whose execution time estimate was exhausted before the submitting thread requested that the scheduler end the constraint. Each activity in the round-robin activity queue further has a circular list of threads of the activity (e.g., threads 2774 of activity $A_B$). A briefly blocked activity queue 2740 contains activity records for activities whose threads have all blocked for a short period of time, and that have been unblocked. These activities have an execution priority that is inferior to the execution of guaranteed constraints, but that is superior to the execution of activities in the round-robin activity queue. The use of the queues shown in FIG. 27 to reassign the processor when it becomes available are discussed in detail below in conjunction with FIGS. 29–34.

Figure 28:
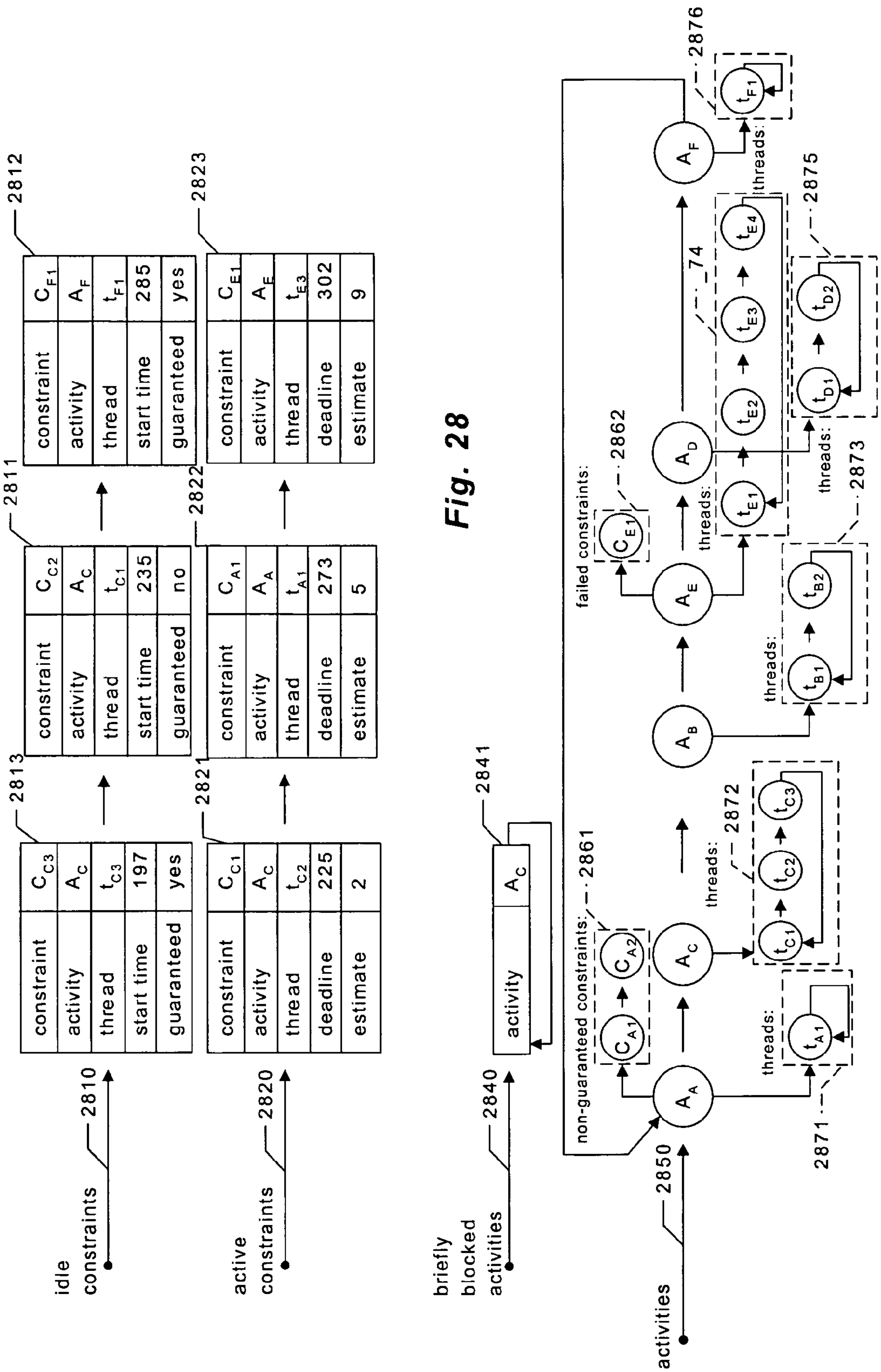
FIG. 28 is a scheduling data structure diagram showing the queues used by the scheduler to maintain the current scheduling state after accepting an urgent constraint.

It can be seen from FIG. 27 that constraint record 2711 for constraint $C_{C2}$, reflects that constraint $C_{C2}$ is guaranteed. However, in accordance with 2307 (FIG. 23), because iterations through a scheduling graph node were reassigned to constraint $C_{C2}$ as shown in FIG. 26, the scheduler changes the guaranteed state of constraint $C_{C2}$ from "yes" to "no." It can be seen from FIG. 28 that record 2811 for constraint $C_{C2}$ has been altered to change the guaranteed status of constraint $C_{C2}$ to "no" in accordance with 2307 (FIG. 23).

Returning to FIG. 23, in 2309, the scheduler allocates to a submitted constraint the iterations through nodes identified in 2301, 2303, and 2306. In 2310, if the start time specified by the submitted constraint is after the current time, then the scheduler continues in 2314, else the scheduler continues in 2311. In 2311, the scheduler inserts the submitted constraint in the active constraint queue 2720. Then, in 2312, the scheduler returns success, indicating that it has accepted the constraint and the method concludes. In 2313, as the start time specified by the submitting constraint is after the current time, the submitted constraint is presently idle, so the scheduler inserts the submitting constraint in the idle constraint queue 2710. It can be seen from FIG. 27 that, in accordance with 2313, the scheduler has inserted constraint record 2713 for submitted constraint $C_{C3}$ at the head of the idle constraints queue 2710. Then, in 2314, the scheduler returns success indicating that the constraint has been accepted, and the method concludes. In 2315, as the total allocations for the submitted constraint fall short of the execution time estimate specified in the submitted constraint, the scheduler inserts the constraint in the non-guaranteed constraint queue for the activity submitting the constraint. Then, in 2316, the scheduler returns failure indicating that the submitted constraint was not accepted, and the method concludes.

Multiprocessor Considerations

As noted, the previous section of the detailed description describes the processing of a constraint in implicit consideration of a uniprocessor, continuous-clock system. In this section, considerations for a multiprocessor environment are presented. As a first matter, it is noted that the multiprocessor and discrete-clock considerations presented earlier in the detailed description have applicability to the scheduling of constraints as well as reservations. The insertion of a constraint, in other words, can parallel the insertion of a reservation, in terms of determining which processor to place the constraint on, for example.

In general, it is noted that on a multiprocessor system, for constraints in particular and reservations and constraints in general, it is desirable not to process part of an activity on one processor, and another part on another processor. This is because of switching and other costs involved in changing processors mid-activity, which results in less than optimal performance. This notwithstanding, however, occasionally it may be necessary to split an activity between processors. For example, consider table 7B, where three activities are defined.

TABLE 7B

| Activity | Desired Amount Reserved | Desired Reservation Window |
|---|---|---|
| $A_A$ | 6 | 10 |
| $A_B$ | 6 | 10 |
| $A_C$ | 6 | 10 |

Assuming a two-processor system, $A_A$ is likely to be reserved on the first processor, while $A_B$ is likely to be reserved on the second processor. This means that on each processor, only four time units of every ten remain available. To schedule $A_C$, there is no single processor that still has six time units of every ten remaining. Therefore, three time units of $A_C$ have to go on one of the processors, while the other three time units have to go on the other processor.

As an aside, it is noted that it is not desirable for a processor's total amount of time units to be allocated by the scheduler to either a set of reservations, a set of constraints, or a combination thereof This is because non-real time applications still need to have processor time, or free time units of the processor. Therefore, in one embodiment, it is desirable to schedule a reservation for "free cycle" time, to guarantee that a certain percentage of the processor's total amount is not reserved to real-time applications.

Moving constraints from one processor to another may also be desirable for optimal performance. For example, an activity $A_A$ may make a reservation that reserves seven of every ten processor time units, such that the reservation is made on a first processor. A constraint for an activity $A_B$ may then make a constraint for the remaining three processor time units for one of these periods, such that the constraint is also placed on the first processor. If activity $A_A$ then makes a constraint for three processor time units, it is likely optimal to place this constraint on the same processor as the reservation of $A_A$ is. Therefore, in this situation, the constraint for activity $A_B$ is better moved to another processor.

The scheduling of reservations and constraints and the movement of constraints in the context of a multiprocessor system can be generalized by one or more of the following guidelines. First, for a constraint in a given thread in an activity, if the thread already has an associated reservation on a particular processor, then it is desirable to schedule the constraint on the same processor if it fits, or if an unrelated reservation on the same processor can be moved to a different processor, such that such movement would permit scheduling of the constraint. Second, for a constraint in a given thread in an activity, if the thread has previously been run on a particular processor, then it is desirable to schedule the constraint on this same processor if it fits, otherwise, the constraint can be scheduled on a different processor. Third, for a reservation for an activity that previously had no reservations, if there is a thread within the activity that has previously been run on a particular processor, then it is desirable to schedule this reservation on the same processor if it fits, otherwise, the reservation can be scheduled on a different processor. Finally, for a new reservation for an activity that is replacing an old reservation for the activity that is already scheduled on a particular processor, it is desirable to schedule this reservation on the same processor if it fits, otherwise, the reservation can be scheduled on a different processor.

Furthermore, in one embodiment of the invention, what is referred to as gang scheduling is provided for. Gang scheduling is where there are a group of related threads, such that all the threads in the gang are attempted to be scheduled on different processors at the same times, allowing them to make progress in parallel as a group. For example, there may be two highly inter-dependent threads A and B that cannot make much progress unless the other one is also concurrently executing. Thus, if, for instance on a dual-processor system, A is scheduled on the first processor from time 0 to time 10, and from time 20 to time 30, then it is also desirable to schedule B on processor 2 from time 0 to time 10 and from time 20 to time 30. This type of co-scheduling, scheduling, which simultaneously schedules all threads of the closely inter-dependent group, is known as gang scheduling.

Gang scheduling is provided for in one specific manner, according to an embodiment of the invention, by using a single plan for multiple processors, where the number of threads in the gangs are the same as the number of processors using this plan. Then, effectively, reservations can be made in one plan for all threads in the gang. Furthermore, at execution time, all the processors using the plan execute all the threads in the gang during their reserved times in the plan. Thus, in one embodiment, a new reservation for a gang of cooperating threads may be received, where the number of threads within the gang is less than or equal to the number of processors within the system. Execution of the gang of threads can then be coscheduled by using a plan encompassing a number of processors equal to the number of threads within the gang, such that each processor within the plan is responsible for a corresponding thread.

Ending a Constraint

In this section of the detailed description, how a constraint is ended is presented. The description is with reference to a uniprocessor, continuous-clock system. However, the description is applicable to a multiprocessor and/or discrete-clock system as well, by allowing for considerations of such systems, as has already been described earlier in the detailed description.

Figure 29:
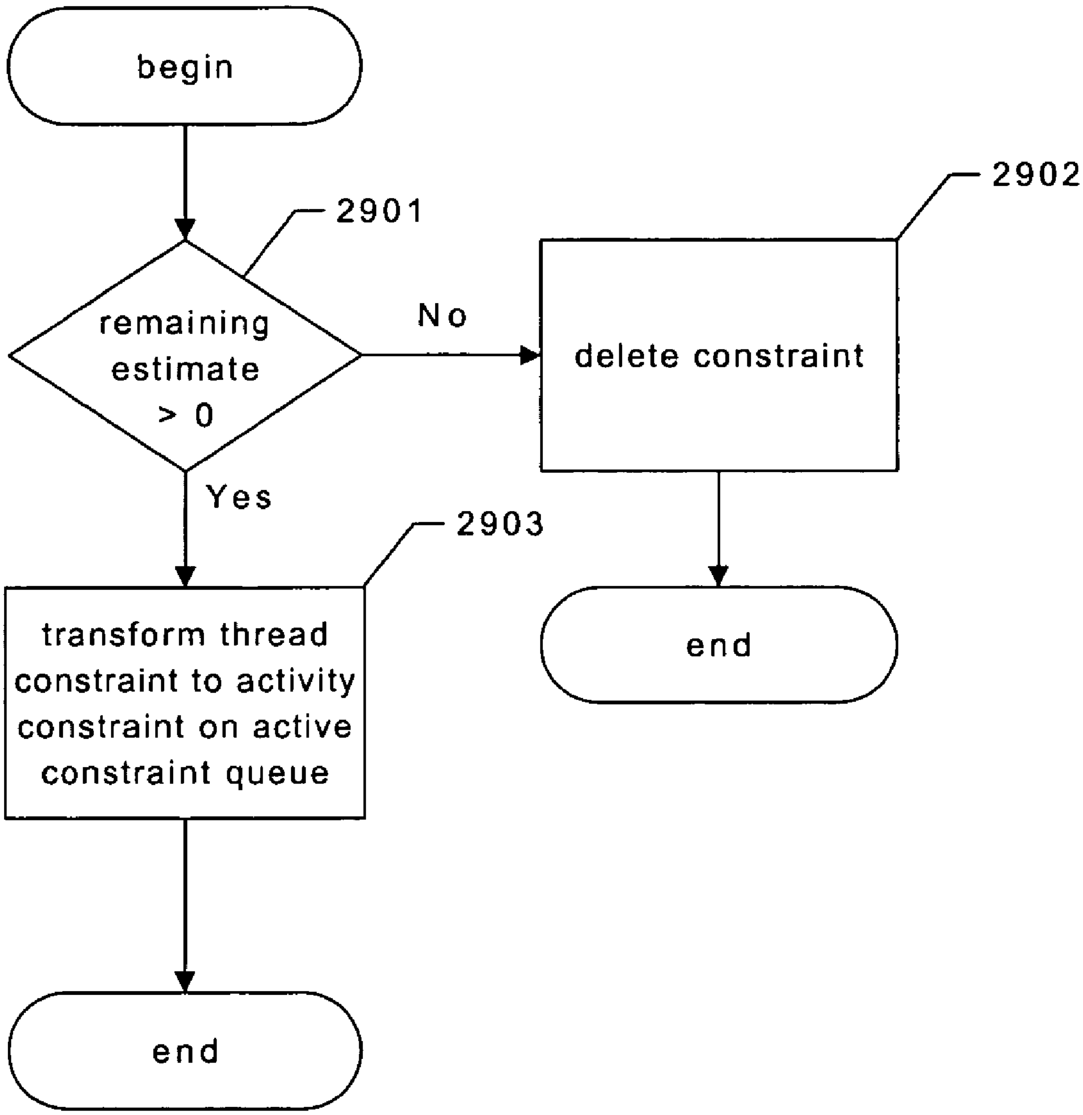
FIG. 29 is a flow diagram showing the method performed by the scheduler to end an accepted constraint in one embodiment.

FIG. 29 is flow diagram showing the method performed by the scheduler in one embodiment to end an accepted constraint in response to a request to end the constraint received from the thread that submitted the constraint. Each time a constraint is executed, the execution time estimate for the constraint is reduced by the amount of time for which the constraint was executed. In 2901, if that remaining estimate for the ended constraint is positive, then the scheduler continues that 2903, else the scheduler continues at 2902. In 2902, as the constraint has no remaining positive estimate, the scheduler deletes the constraint and the method concludes. In 2903, as a portion of the estimate specified by the constraint remains even though the constraint has been completed, the scheduler transforms the ended thread constraint into an activity constraint on the active constraint queue. Iterations through nodes allocated to an activity constraint are used by any of the activity's threads, which will collectively receive the remaining estimate of the constraint by the constraint's deadline. This enables the activity to use all of its reserved execution time, even if the size of the constraint for which the execution was reserved was overestimated by the submitting thread. 2903 permits the remaining portion of the execution time estimate to be utilized by any thread of the activity submitting the constraint. This method then concludes.

A thread for which a constraint is already pending may submit a further constraint, called a "nested constraint." A thread generally uses nested constraints to express special execution expectations for subtasks of the task corresponding to the already-pending constraint. A nested constraint in one embodiment temporarily replaces the already-pending constraint, whether it is in the active constraints list or the non-guaranteed constraints list for the activity to which the submitting thread belongs. When replacing the already-pending constraint with the nested constraint, the scheduler transfers any portion of the execution time estimate of the already-pending constraint between the start time and deadline of the nested constraint to the execution time estimate of the nested constraint, up to the amount of time specified for the nested constraint by the submitting thread. If the portion of the execution time estimate transferred from the already-pending constraint is less than the amount of time specified for the nested constraint by the submitting thread, the scheduler allocates additional iterations through free nodes and nodes dedicated to the activity to which the submitting thread belongs between the start time and deadline of the nested constraint, if possible. (If the requested constraint is critical, the scheduler also reallocates iterations through nodes allocated to non-critical constraints of the same activity, if necessary.) When the schedule thereafter selects the nested constraint for execution, it executes the submitting thread, and subtracts the time that the submitting thread is executed from the execution time estimate for the nested constraint. When the submitting thread submits a request to the scheduler to end the nested constraint, the scheduler replaces the nested constraint with the original constraint, and transfers any execution time estimate remaining in the nested constraint back to the original constraint. Constraints may be successively nested—that is, when a thread is executing under a nested constraint and submits a new constraint, the scheduler replaces the pending nested constraint with the new constraint in the same manner.

Reassigning a Processor to a New Thread

In this section of the detailed description, how a processor is reassigned to a new thread, when the processor becomes available, is presented. The description is with reference to a uniprocessor, continuous-clock system. However, the description is applicable to a multiprocessor and/or discrete-clock system as well, by allowing for considerations of such systems, as has already been described earlier in the detailed description.

Figure 30:
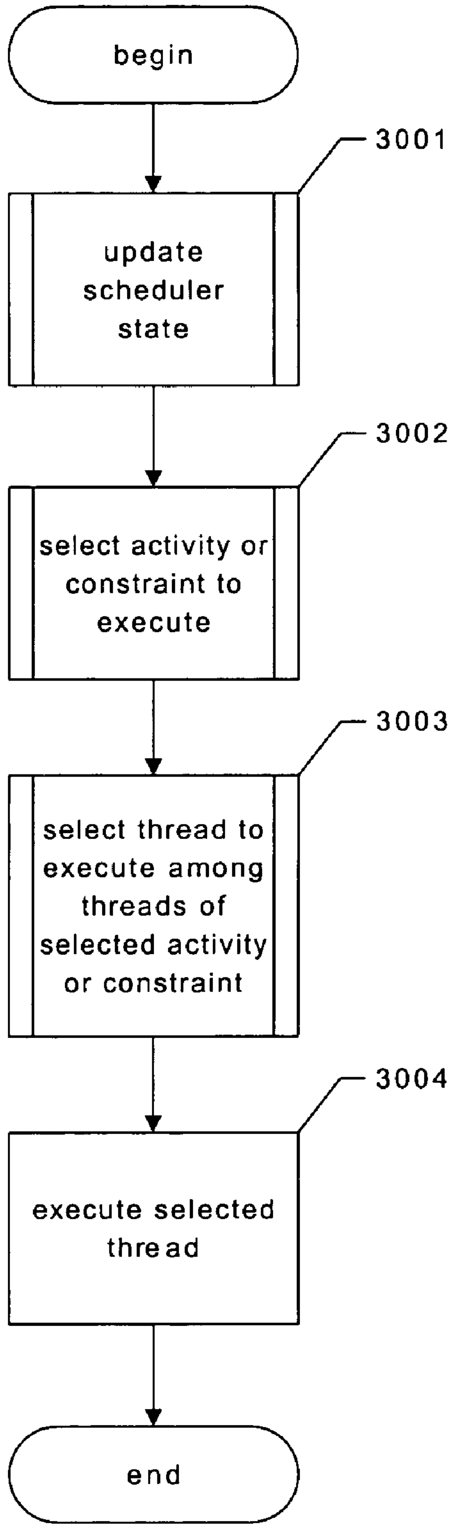
FIG. 30 is an overview flow diagram showing the method performed in one embodiment by the scheduler to reassign the processor to a new thread, i.e., execute a new thread, when the processor becomes available.

FIG. 30 is an overview flow diagram showing the method performed by the scheduler in one embodiment to reassign the processor to, or execute, a new thread when the processor becomes available. In 3001, the scheduler updates its state to reflect current execute conditions within the computer system. The performance of 3001 is discussed below in detail in conjunction with FIG. 31. In 3002, the scheduler selects an activity or constraint to execute. The performance of 3002 is discussed in detail below in conjunction with FIG. 32. In 3003, the scheduler selects a thread to execute among the threads of the selected activity or constraint. The performance of 3003 is discussed below in conjunction with FIG. 34. In 3004, the scheduler executes the thread selected in 3003. This method then concludes.

Figure 31:
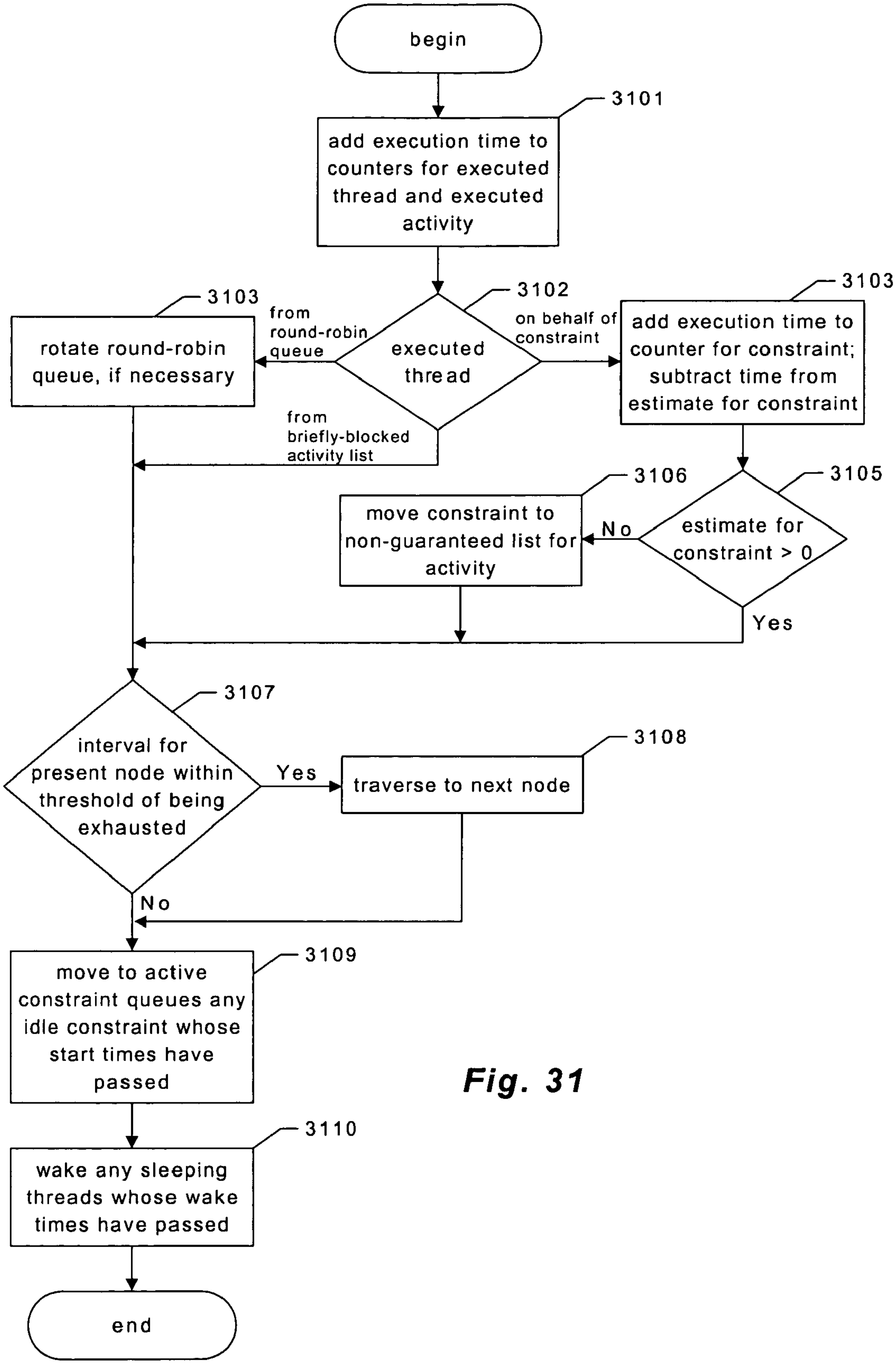
FIG. 31 is a flow diagram showing the method performed in one embodiment by the scheduler to update the current scheduling state before reassigning the processor to a new thread.

FIG. 31 is a flow diagram showing the method performed by the scheduler in one embodiment to update the current scheduling state before reassigning the processor to a new thread. 3101–3107 involve updating the current scheduling state to reflect the execution of the thread whose execution was just concluded. In 3101, the scheduler adds the amount of time for which the last-executed thread was executed to execution time counters for both the executed thread and the activity to which it belongs. In 3102, if the last-executed thread was executed from the head of the round-robin queue 3150 (FIG. 31), then the scheduler continues at 3103, else if the last-executed thread was executed on behalf of a constraint, then the scheduler continues at 3104, else the last-executed thread was executed from the briefly-blocked activity list and the scheduler continues at 3107. In 3103, the scheduler rotates the round-robin queue, if necessary. A standard allotment is in one embodiment specified for the round-robin queue, indicating the amount of time for which threads of the activity at the head of the round-robin queue should be executed before the activity at the head of the round-robin queue is rotated to the tail of the round-robin queue. In 3103, if threads of the activity at the head of the round-robin queue have executed for at least the standard allotment, the scheduler rotates the activity from the head of the round-robin queue to the end of the round-robin queue. Further, if the last-executed thread was selected from the head of the activity's thread list rather than its non-guaranteed constraint list, the thread at the head of the activity's thread list is rotated to the tail of the activity's thread list. After 3103, the scheduler continues at 3107.

In 3104, the scheduler adds the execution time to an execution time counter for the constraint and subtracts the execution time from the execution time estimate for the constraint. In 3105, if, after subtracting the execution time from the execution time estimate for the constraint in 3104, the execution time for the constraint is greater than zero, then the scheduler continues at 3107, else the scheduler continues at 3106. In 3106, because the constraint has exhausted its execution time estimate, the scheduler moves the constraint from the active constraint list to the non-guaranteed constraint list for the activity. In 3106, if the constraint is an activity constraint into which a thread constraint was converted when the submitting thread requested that the constraint be completed before its estimate was exhausted, the constraint is destroyed instead of being moved to the non-guaranteed constraint list (not shown). In the non-guaranteed constraint list for the activity, the constraint will have a lower execution priority than it did on the active constraint list, but will have a higher execution priority than threads on the circular list of threads for the activity. In 3107, if the interval for the present node in the scheduling graph is within a minimum time threshold of being exhausted, then the scheduler continues at 3108, else the scheduler continues at 3109. The minimum time threshold is determined using the time cost of a context switch, as well as the time cost of assigning the processor to a new thread shown in FIG. 30. In 3108, because at least a minimum time slice does not remain in the current iteration through the present node of the scheduling graph, the scheduler traverses to the next node in the scheduling graph in the root-to-leaf traversal of the scheduling graph. If the present node of the scheduling graph is not a leaf node, 3108 involves moving to the next node in the present root-to-leaf path. If the present node is a leaf node, 3108 involves returning to the root of the scheduling graph to traverse to the first node of the next root-to-leaf path. If the present root-to-leaf path is the last one in the scheduling graph, the scheduler in one embodiment returns to the root of the scheduling graph and traverses to the first node of the first root-to-leaf path to begin a new complete traversal of the scheduling graph. In 3109, the scheduler moves to the active constraint queue 2720 (FIG. 27) any constraints in idle constraint queue 2710 whose start times are earlier than the current time. In 3110, the scheduler wakes any sleeping threads whose wake times are earlier than the current time. The method then concludes.

Selecting a Constraint or Activity to Execute

In this section of the detailed description, how a an activity or constraint is selected for execution, is presented. The description is with reference to a uniprocessor, continuous-clock system. However, the description is applicable to a multiprocessor and/or discrete-clock system as well, by allowing for considerations of such systems, as has already been described earlier in the detailed description. Furthermore, the next section details other multiprocessor and/or discrete-clock considerations that may be provided for.

Figure 32:
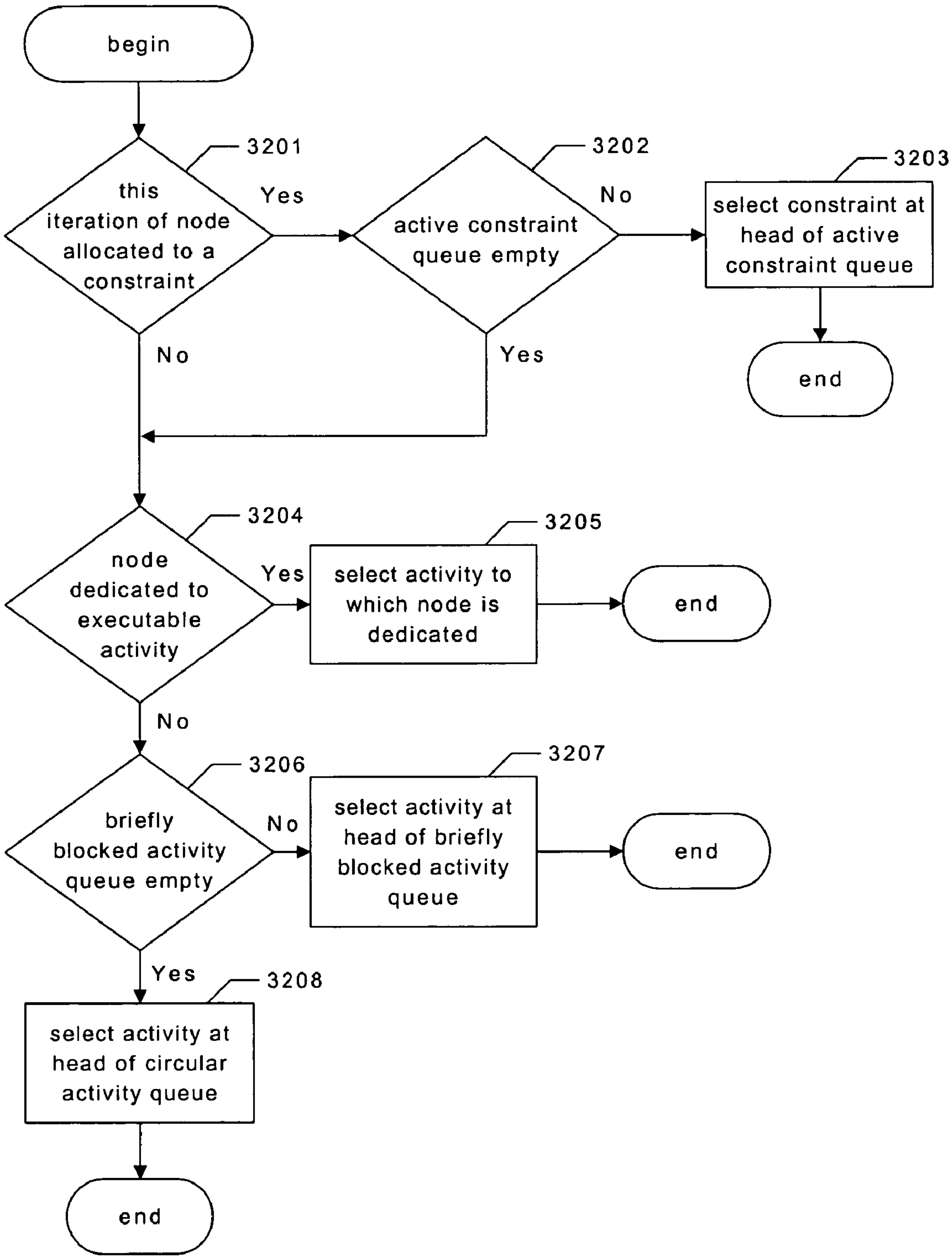
FIG. 32 is a flow diagram showing the method performed in one embodiment by the scheduler to select a constraint or activity to execute.

FIG. 32 is a flow diagram showing the method performed in one embodiment by the scheduler to select a constraint or activity to execute. Briefly, this involves selecting the first constraint or activity in the following list that exists: the constraint at the head of the active constraint queue, the activity to which the present node is dedicated, the activity at the head of the briefly blocked activity queue, and the activity at the head of the circular activity queue. In 3201, if the present node iteration is allocated to a constraint, then the scheduler continues in 3201, else the scheduler continues in 3206. In 3202, if the active constraint queue is empty, then the scheduler continues at 3204, else the scheduler continues at 3203. In 3203, as there are constraints on the active constraint queue, the scheduler selects the constraint at the head of the active constraint queue for execution, and the method concludes. In 3204, if the present scheduling graph node is dedicated to an executable activity having at least one unblocked thread, then the scheduler continues at 3205, else the schedule continues with 3206. In 3205, the scheduler selects for execution the activity to which the present scheduling graph node is dedicated, and the method concludes. In 3206, if the briefly blocked activity queue is empty, then the scheduler continues at 3208, else the scheduler continues at 3207. In 3207, the scheduler selects for execution the activity at the head of the briefly blocked activity queue, and the method concludes. In 3208, the scheduler selects for execution any activity at the head of the circular activity queue. The method then concludes.

3203, discussed above, involves selecting the constraint at the head of an active constraint queue, and therefore the constraint in that constraint queue with the earliest deadline, for execution without regard for the constraint to which the present scheduling graph node iteration is allocated. While the scheduler's allocation of specific iterations of specific nodes to specific constraints is designed to ensure the successful execution of all accepted constraints, the same benefits can be achieved while retaining more flexibility for future execution by applying the earliest deadline first principle. According to the earliest deadline first principle, when selecting between projects, to which to dedicate resources, the project having the earliest deadline should always be selected.

Figure 33:
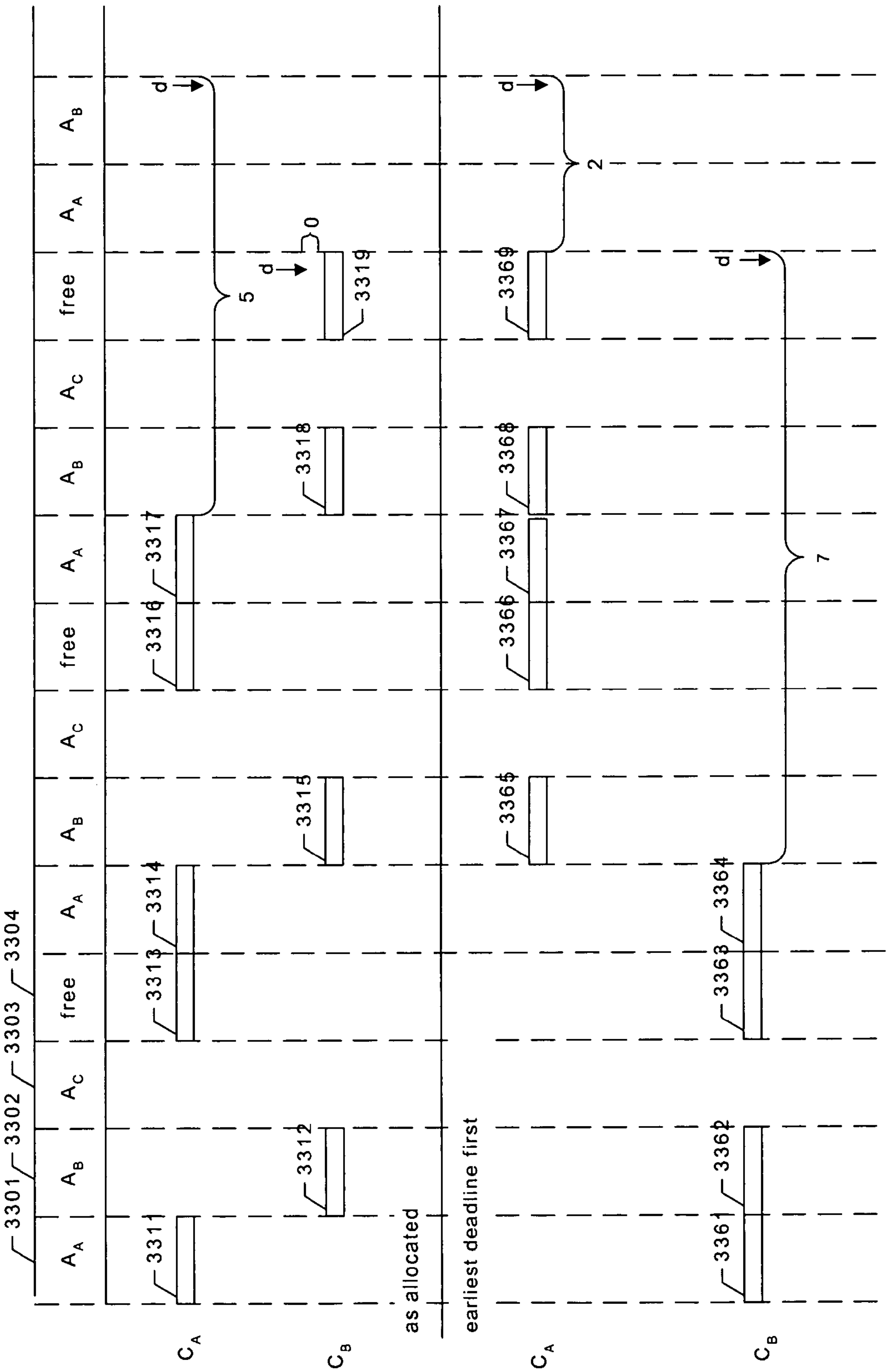
FIG. 33 is a timing diagram comparing the execution of constraints in earliest deadline first order with the execution of constraints in strict accordance with the allocation of scheduling graph node iterations.

FIG. 33 is a timing diagram comparing the execution of constraints in this earliest deadline first order with the execution of constraints in strict accordance with the allocations of the scheduling graph nodes. FIG. 33 summarizes the execution of two constraints, $C_A$ and $C_B$. Above the horizontal center line, FIG. 33 shows the execution of these constraints in strict accordance with the allocation of scheduling graph node iterations, and below the center horizontal line, the Figure shows the execution of the constraints in accordance with the earliest deadline of the first order. Constraint $C_B$ has an earlier deadline 3351, while constraint $C_A$ has a later deadline 3352. Each column corresponds to an iteration through a node allocated to constraint $C_A$, a node allocated to constraint $C_B$, a node dedicated to activity $A_C$, and a free node. Blocks occurring at the intersection of a row, corresponding to one of the two constraints, and a column, corresponding to an iteration through a node, indicates a period of time in which the constraint is executed. It can be seen that, using the as-allocated approach, constraint $C_A$ finishes 5 time units before its deadline, and constraint $C_B$ finishes 0 time units before its deadline, for an average of 2.5 time units. On the other hand, it can be seen that, using the earliest deadline first approach, constraint $C_A$ finishes 2 time units before its deadline, and constraint $C_B$ finishes 7 time units before its deadline, for an average of 4.5 time units. The above results demonstrate that the application of an earliest deadline first approach helps to complete constraints as early as possible before their deadlines, and thereby can provide flexibility for future scheduling. In an alternate embodiment, however, the scheduler uses the as-allocated approach in order to continue satisfying reservations for activities submitting constraints with regularity as discussed above in conjunction with FIGS. 26A and 26B.

Figure 34:
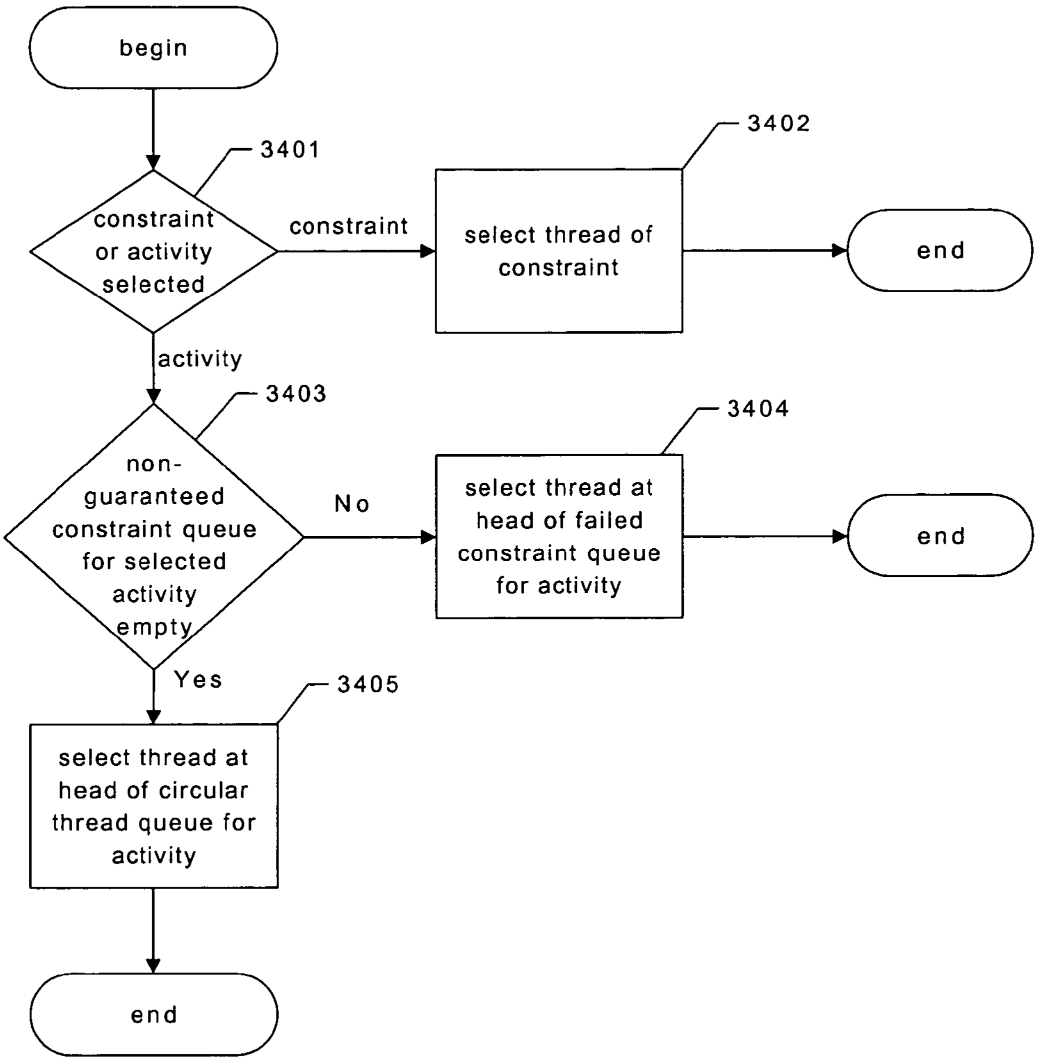
FIG. 34 is a flow diagram showing the method performed in one embodiment by the scheduler to select a thread of the selected constraint or activity to execute.

FIG. 34 is a flow diagram showing the method performed in one embodiment by the scheduler to select a thread of the selected constraint or activity to execute. In 3401, if the scheduler selected a constraint in the method shown in FIG. 32, then the scheduler selects the thread that submitted this constraint in 3402 and this method concludes, else if the scheduler selected an activity in the method shown in FIG. 32, the scheduler continues in 3403. In 3403, if the non-guaranteed constraint queue for the activity selected in the method shown in FIG. 32 is empty, then the scheduler continues at 3405, else the scheduler continues at 3404 to select the thread at the head of the non-guaranteed constraint queue for the selected activity and the method concludes. In 3405, the scheduler selects the thread at the head of the circular thread queue for the selected activity, when the methods conclude.

Constraints are each originally submitted by a single thread. The scheduler will transform a thread constraint into an activity constraint if the thread submits a request to end the constraint before its execution time estimate is exhausted. While the scheduler can execute any of the threads of the activity specified by an activity constraint when the activity constraint is selected for execution, thread constraints each specify a single thread that may be executed when the thread constraint is selected for execution. The identity of the thread specified by a thread constraint may, however, be temporarily changed to a thread other than the submitting thread to improve the submitting thread's opportunity to execute. This process is described as "inheriting" the thread constraint from the submitting thread to an inheriting thread. During the period of inheritance, when the inherited thread constraint is selected for execution, the scheduler executes the inheriting thread instead of the submitting thread.

Synchronization mechanisms are a feature of multitasking operating systems that coordinate the use of a particular resource of the computer system by different threads. A mutual exclusion semaphore ("mutex") is a synchronization mechanism used to coordinate the use of a resource that may only be used by one thread at a time. In order to coordinate the use of such a resource, any thread that needs to use the resource must attempt to "acquire" the mutex before using the resource, and must release the mutex after it has finished using the resource. If, when the thread attempts to acquire the mutex, the mutex is not "owned" by any other thread, the thread attempting to acquire the mutex is allowed to do so and immediately begin using the resource. On the other hand, if the mutex is owned by another thread when the thread attempts to acquire it, the operating system "blocks," or suspends the execution of, the thread attempting to acquire the mutex, until the mutex becomes available and the operating system allows the thread to acquire the mutex.

When a thread that is executing under a thread constraint blocks on an owned mutex, the scheduler cannot execute this thread even when its constraint is selected for execution—this thread must remain blocked until the thread owning the mutex releases it. In order to expedite the owning thread's release of the mutex in cases in which the blocked thread must be executed soon in order to satisfy its constraint, the scheduler in one embodiment inherits the constraint of the blocked thread to the owning thread. During the period of inheritance, when the scheduler selects the constraint for execution, it executes the inheriting thread instead of the blocked thread. The time for which the inheriting thread executes during the period of inheritance is deducted from the estimate for the constraint. When the owning thread finishes its use of the resource and releases the mutex and the blocked thread is unblocked and allowed to acquire the mutex, the period of inheritance ends, and the unblocked thread is again executed when the constraint is selected for execution. Inheritance of constraints in this manner is transitive—that is, in cases in which the inheriting thread itself blocks on a mutex owned by a third thread, the scheduler inherits the constraint to this third thread in the same manner.

Multiprocessor Considerations

As described in the previous section, in a uniprocessor system, constraints are generally run such that the constraint with the earliest deadline is executed first. Thus, all constraints are put in a pool, and when a free cycle for the processor is encountered, the constraint with the earliest deadline is executed first.

For a multiprocessor system, this same execution strategy is desirably followed on a per-processor basis. If context-switching costs between or among processors is minimal, however, it is optimal instead to utilize this same execution strategy over all the processors. As can be appreciated by those of ordinary skill within the art, however, this is usually not the case.

Furthermore, it is noted that the multiprocessor and discrete-clock considerations presented earlier in the detailed description have applicability to decision-making as to which constraint and/or activity to execute, as can be appreciated by those of ordinary skill within the art.

Changes in Clock Period During Scheduling

As described herein, it has been implicitly assumed that the clock period of the system is a fixed constant. However, in some operating systems, such as Windows NT, the clock period may in fact be changeable. For example, depending on the underlying platform on which an operating system is run, the clock period may be specified as fractions of seconds of the form $\frac{1}{2}^n$, where n is selectable. Because of this added variable, there are strategies that can be used to select the clock variable.

As a simple, albeit non-optimal, solution, a very small clock period can be chosen. In the case of discrete-time systems where having a very small clock period maximizes the fraction of a processor that effectively is utilized for predictably scheduled work items, this may be desirable, although, as those of ordinary skill within the art can appreciate, clock interrupt overheads become more significant as clock frequent increases, so tradeoffs must be made. Reservations and constraints are made to conform to this smallest clock period as has been described. Interim clock periods that the scheduler may be alerted to via operating system interrupts—that is, interim clock periods that have no correlation to the changing of one activity to another activity within a scheduling graph—are ignored in this embodiment.

Another strategy is to just use the current clock resolution that the operating system defaults to. This solution is also simple, albeit also non-optimal.

A more optimal solution is to set the clock period dependent on the reservations and constraints presented to the scheduler. For example, a reservation of the form 10 time units of every 30 time units requires a resolution of at most 10 time units for optimal scheduling of the processor. If it is possible to set the clock period to at most 10 time units, then this should be done, assuming that the clock period is not already less than 10 time units. Thus, this strategy dictates examining each new reservation as it is encountered by the scheduler, and to decrease the clock period if the new reservation so requires (and, of course, the clock period is so changeable). It is not desirable to increase the clock period, unless doing so does not adversely affect the resolution required for already scheduled reservations.

Furthermore, as the clock period is changed, the scheduling plan for each processor in the system must be rebuilt, as has been described. This is because in general the clock period affects each processor. Processors do not typically have independently set clock periods. However, in a system with individual clocks per processor, different periods could be used for different scheduling plans, as those of ordinary skill within the art can appreciate.

Utilization of an Existing Scheduler

As described elsewhere in the application, the scheduler is implicitly presumed to be the only scheduler run on the operating system. However, for operating systems such as Windows NT, this is not necessarily the case. Although the inventive scheduler can be implemented on any operating system to be the only scheduler, this brute-force technique may not be desirable for open operating systems where other applications are presumed to using the existing scheduler. Therefore, in one embodiment, the inventive scheduler is implemented cooperatively on the existing scheduler, such as the existing scheduler for Windows NT.

It is noted that Windows NT has 32 priorities. 0 is reserved for the zero page thread. 1–15 for time-sharing threads, which are subject to increased quanta for threads in the foreground process, and priority boosts under certain circumstances. Priorities 16–31 are real-time priorities; Windows NT never adjust the priorities or quanta, and simply round-robins among runnable threads at the highest priority.

A scheduler according to an embodiment of the invention can thus schedule threads using the Windows NT scheduler, rather than bypassing it. To schedule a thread, the inventive scheduler raises it to a priority of 30. For this strategy to work, no thread outside the inventive scheduler can spend significant amounts of time running at priority 30 or 31, else the inventive scheduler will be interfered with, such that it will not have an accurate picture of available processor resources. Other priority values could be chosen, including ones as high as or higher than any already existing priority level.

In one embodiment where a computer system has an existing scheduler, the existing scheduler may use unreserved time slots to schedule threads that do not have time requirements, and thus are otherwise unscheduled. In another embodiment, the existing scheduler can also schedule threads that have already been scheduled by a scheduler according to the invention during these unreserved time slots.

Conclusion

While this invention has been shown and described with reference to various embodiments, it will be understood by those skilled in the art that various changes or modifications in form and detail may be made without departing from the scope of the invention. For example, the foregoing describes the construction and use of scheduling graphs in which branches in one level of the scheduling graph each split into two branches in the succeeding level of the scheduling graph. Indeed, those skilled in the art will recognize that one branch in the level of the scheduling graph can be straightforwardly split into any number of branches in the succeeding level. In fact, different branches could be split into different numbers of subbranches within the same scheduling graph. Those skilled in the art will further appreciate that each root-to-leaf path could be weighted to be traversed any specified number of times during one complete traversal of the scheduling graph, instead of being traversed only once during a complete traversal of the scheduling graph as described.

We claim:

1. A computer implemented method for a discrete-clock computer system having a plurality of processors comprising:

receiving an activity comprising at least one of: a constraint for a thread in the activity specifying a desired earliest start time, amount of requested execution time, and a deadline; and a reservation for the activity specifying a recurring desired number of time units within a desired period;

determining one of the plurality of processors for which execution of the activity and threads within the activity that are to be scheduled, based on a heuristic; modifying at least one of:

the desired earliest start time, the amount of requested execution time and the deadline for the time constraint, and the desired amount of execution and the desired period of the reservation based on a granularity of the discrete-clock computer system; and when the computer system has a modifiable period, the modifiable period based on at least one of the earliest start time, the amount of requested execution time and the deadline for a time constraint, and the desired amount of execution and the desired period of the reservation; and scheduling the activity and the constraint for execution on the determined one of the plurality of processors, including inserting the activity and the constraint on a schedule for the determined one of the plurality of processors.

2. The method of claim 1, wherein the heuristic comprises determining the least loaded of the plurality of processors.

3. The method of claim 1, wherein the heuristic comprises determining a processor having other activities scheduled for execution thereon that are related to the activity.

4. The method of claim 1, wherein the heuristic comprises determining a processor having other activities scheduled for execution thereon that have a similar period to the desired period.

5. The method of claim 1, wherein the heuristic comprises randomly selecting a processor.

6. The method of claim 1, wherein the heuristic comprises performing an exhaustive search.

7. The method of claim 1, wherein the schedule is specific to the determined one of the plurality of processors.

8. The method of claim 1, wherein the schedule is specific to a sub-plurality of the processors including the determined one of the plurality of processors.

9. The method of claim 1, wherein the schedule is for all the plurality of processors including the determined one of the plurality of processors.

10. The method of claim 1, wherein the computer system has an existing scheduler, and wherein the scheduling is performed utilizing the existing scheduler.

11. The method of claim 10, wherein the existing scheduler uses unreserved time slots to schedule otherwise unscheduled threads.

12. The method of claim 11, wherein the existing scheduler also schedules scheduled threads during unreserved time slots.

13. A computer implemented method for a discrete-clock computer system having a plurality of processors comprising:

receiving an activity comprising at least one of: a constraint for a thread in the activity specifying a desired earliest start time, an amount of requested execution time, and a deadline; and a reservation for the activity specifying a recurring desired number of time units within a desired period;

determining at least one of the plurality of processors for which execution of the activity and threads within the activity that are to be scheduled, based on a heuristic;

modifying at least one of:

the desired earliest start time, the amount of requested execution time and the deadline for the time constraint, and the desired amount of execution and the desired period of the reservation based on a granularity of the discrete-clock computer system; and when the computer system has a modifiable period, the modifiable period based on at least one of the earliest start time, the amount of requested execution time and the deadline for a time constraint, and the desired amount of execution and the desired period of the reservation; and scheduling the activity and the constraint for execution on the determined one of the plurality of processors, including inserting the activity and the constraint on a schedule for the determined at least one of the plurality of processors.

14. The method of claim 13, wherein determining at least one of the plurality of processors comprises determining a single one of the plurality of processors.

15. The method of claim 13, wherein determining at least one of the plurality of processors comprises determining whether the activity fits on a single one of the plurality of processors, and upon determining that the activity does not fit on a single one of the plurality of processors, splitting the activity onto at least two of the plurality of processors.

* * * * *